(12) United States Patent
Wilkes et al.

(10) Patent No.: US 11,065,560 B2
(45) Date of Patent: Jul. 20, 2021

(54) LIQUID CONTAINER MONITORING AND FILTRATION SYSTEM

(71) Applicant: Wilkes Solutions, Inc., Marietta, GA (US)

(72) Inventors: Chan Wilkes, Marietta, GA (US); Alex Lopez, Marietta, GA (US)

(73) Assignee: WILKES SOLUTIONS, INC., Marietta, GA (US)

( * ) Notice: Subject to any disclaimer, the term of this patent is extended or adjusted under 35 U.S.C. 154(b) by 0 days.

(21) Appl. No.: 16/180,899

(22) Filed: Nov. 5, 2018

(65) Prior Publication Data

US 2019/0134536 A1 May 9, 2019

Related U.S. Application Data

(60) Provisional application No. 62/581,362, filed on Nov. 3, 2017.

(51) Int. Cl.
| | |
|---|---|
| *B01D 17/12* | (2006.01) |
| *C02F 3/00* | (2006.01) |
| *B01D 17/04* | (2006.01) |
| *B01D 17/02* | (2006.01) |
| *B01D 17/00* | (2006.01) |
| *F02M 37/00* | (2006.01) |
| *F02M 37/24* | (2019.01) |
| *C02F 1/00* | (2006.01) |
| *F02M 37/50* | (2019.01) |
| *F02M 37/26* | (2019.01) |

(52) U.S. Cl.
CPC .......... *B01D 17/12* (2013.01); *B01D 17/0205* (2013.01); *B01D 17/047* (2013.01); *B01D 17/10* (2013.01); *C02F 3/00* (2013.01); *F02M 37/0076* (2013.01); *F02M 37/24* (2019.01); *C02F 1/004* (2013.01); *C02F 1/008* (2013.01); *C02F 2301/046* (2013.01); *F02M 37/007* (2013.01); *F02M 37/26* (2019.01); *F02M 37/50* (2019.01)

(58) Field of Classification Search
CPC ........ G01F 1/007; B65D 90/48; B01D 61/147
See application file for complete search history.

(56) References Cited

U.S. PATENT DOCUMENTS 5,351,725 A * 10/1994 Suthergreen ............ G01F 1/007
141/1
5,406,828 A * 4/1995 Hunter .................... G01F 1/363
73/1.31

(Continued)

*Primary Examiner* — Richard C Gurtowski
(74) *Attorney, Agent, or Firm* — Smith, Gambrell & Russell

(57) ABSTRACT

The invention is directed to a liquid container monitoring and maintenance system. In an aspect, the liquid container monitoring and maintenance system (LCMMS) is a self-contained system that is compatible to monitor and maintain various liquids stored in various types and sizes of containers. In such aspects, the LCMMS is an all in one solution for monitoring and maintaining the liquid within the container. The LCMMS is configured to be an external system that can couple to various storage containers via various access ports. The LCMMS is configured to automatically monitor and maintain the liquid contained within the container. In an aspect, the LCMMS can be remotely controlled, as well as provide reporting to various users.

18 Claims, 21 Drawing Sheets

(56) References Cited

U.S. PATENT DOCUMENTS

| | | | | |
|---|---|---|---|---|
| 2007/0199875 A1* | 8/2007 | Moorey | ............... | B01D 61/147 210/206 |
| 2012/0314059 A1* | 12/2012 | Hoffmann | ............. | G01F 23/292 348/135 |
| 2014/0039816 A1* | 2/2014 | Van Bekkum | ......... | B65D 90/48 702/55 |

* cited by examiner

Filtration System 310

LIQUID CONTAINER MONITORING AND FILTRATION SYSTEM

FIELD OF THE INVENTION

The invention deals with the automatic monitoring and maintenance of liquids within a liquid container.

BACKGROUND OF THE INVENTION

Backup systems are common in our daily lives. For example, cellular towers, hospitals, critical response centers, and the like rely on backup generators to provide electricity in the case of power grid outages. Similarly, backup water supplies and sprinkler systems are used to provide water when the normal sources of water are unavailable (e.g., marine vessels), or in the case of fire. While these might seem to be dissimilar in nature, these backup systems rely on the storage of some type of fluid. In addition, there are several other types of active and backup systems that require the storage of some liquid as well.

However, many of these systems have fuel and liquid sources that can sit for long periods of time without activity, which can lead to the liquid becoming contaminated. Contaminated fuel can be very costly. For example, standby power systems need a clean supply of diesel to maintain proper engine function and more importantly, to perform when the power grid shuts down. The contamination can be detrimental to the operation of the systems (providing a clean water source or providing backup power), including the complete failure of the system. While scheduling the replacement of the liquid on a regular basis can take care of these problems, to do so can be expensive, time consuming, and potentially ineffective, especially if the container holding the liquid becomes compromised, or the container is not adequately sealed.

In addition, while monitoring systems are available for these remote systems, many of the monitoring systems are built in to the original systems, or only provide monitoring functions. That is, these monitoring systems do nothing to treat the liquids within the containers. Further, older systems require retrofitting of specific monitoring solutions, which can be prohibitively expensive.

Therefore, there is a need for a remote monitoring system that is capable of actually providing maintenance services to liquid storage systems. In addition, there is a need for such systems to be easily implemented with various liquid storage systems.

SUMMARY OF INVENTION

The invention is directed to a liquid container monitoring and maintenance system. In an aspect, the liquid container monitoring and maintenance system (LCMMS) is a self-contained system that is compatible to monitor and maintain various liquids stored in various types and sizes of containers. In such aspects, the LCMMS is an all in one solution for monitoring and maintaining the liquid within the container. In an aspect, the LCMMS is configured to be an external system that can couple to various storage containers via various access ports. In an aspect, the LCMMS is configured to automatically monitor and maintain the liquid contained within the container. In an aspect, the LCMMS can be remotely controlled, as well as provide reporting to various users.

In an aspect, the LCMMS is configured to filter liquids contained within containers. In other aspects, the LCMMS can also chemically treat the liquids of stored within the container, as well as prevent condensation from occurring. These and other aspects are described in more detail below.

DETAILED DESCRIPTION OF THE INVENTION

Figure 1:
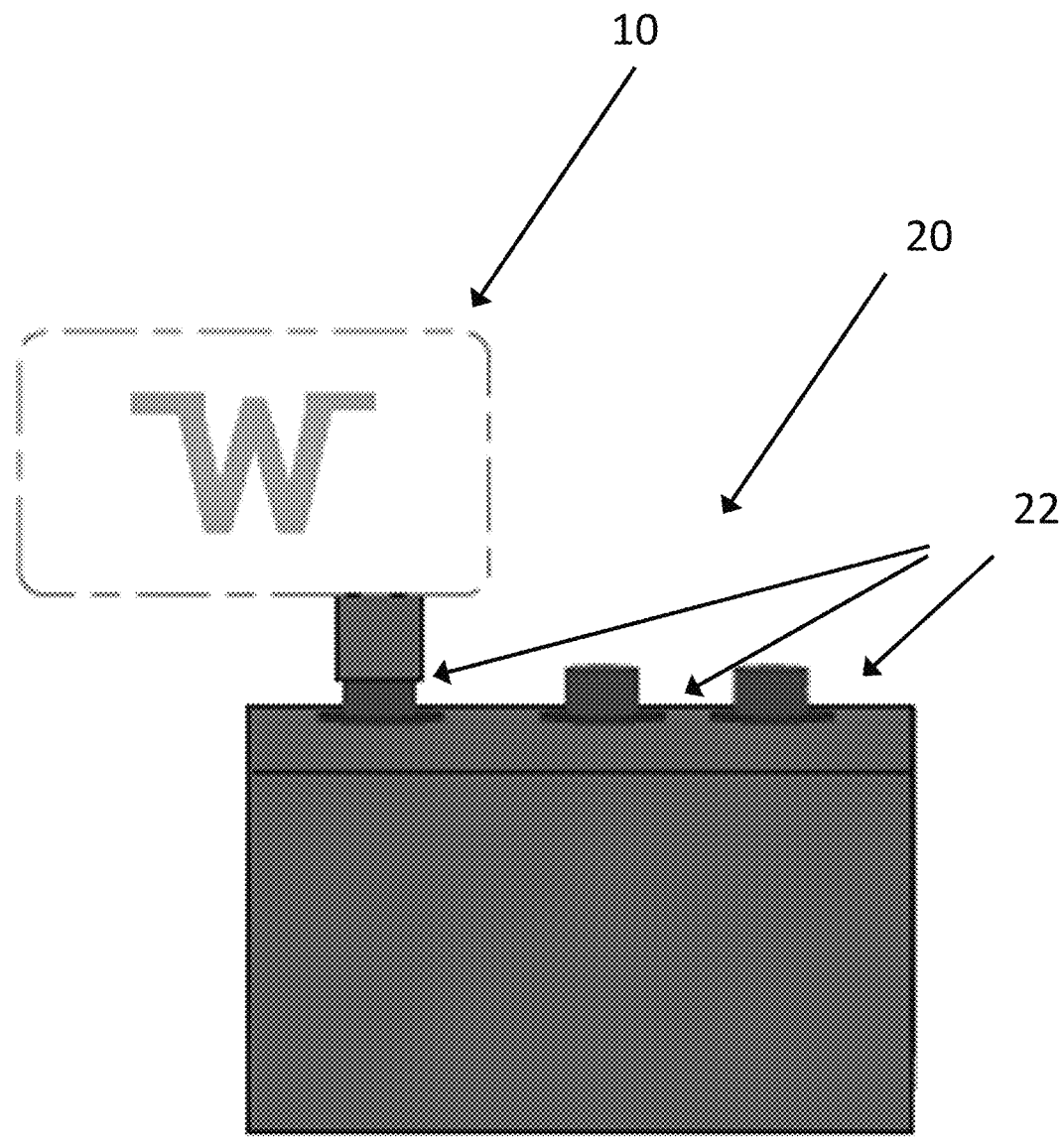
FIG. 1 is a schematic illustration of the liquid container monitoring and maintenance system being utilized by a liquid container according to an aspect of the present invention.

In the following detailed description of the preferred embodiments, reference is made to the accompanying drawings, which form a part hereof, and within which are shown by way of illustration specific embodiments by which the invention may be practiced. It is understood that other embodiments may be utilized and structural changes may be made without departing from the scope of the invention.

In an aspect, the invention is directed at a liquid container monitoring and maintenance system (LCMMS) 10, as shown in FIGS. 1-21. The LCMMS 10 is configured to automatically monitor and maintain, both discussed in detail below, liquids held within various liquid containers 20, as shown in FIGS. 1-3, 11-12, and 20-21. In such aspects, the LCMMS 10 is configured to be a closed system, with it and its components being self-contained, and separate component from a liquid container 20. In an aspect, the LCMMS 10 can assist with fuel transfer as well.

In an aspect, the majority of the components of the LCMMS 10 are contained within a housing 100 of the LCMMS 10. In an aspect, the housing 100 is comprised of rugged materials that can withstand hazardous and environmental elements. For example, the housing 100 can be made of materials that include, but are not limited to, thermoplastic polymers resistant to corrosive chemicals and/or physical impacts (e.g., utility grade acrylonitrile butadiene styrene), metals (e.g., stainless steels, aluminum), and any other material that can be lightweight while being able to withstand diesel fuel, water, and corrosive elements. The thickness of the exterior housing can very as well. In an aspect, when using ABS, the thickness can be approximately 3/16 of an inch. However, the thickness can vary depending on the application and the material make-up of the housing 100.

In an aspect, the housing 100 is configured to provide access to interior components. For example, the housing 100 can include a frame portion 102 (see FIGS. 4-5) with removable sides 103. The sides can be attached with various reusable fasteners and the like. Further, the housing 100 can be configured to have limited access, utilizing various means, including, but not limited to, locks and the like. For example, tack screws can be utilized to bolt down the housing 100. In another aspect, a user interface (e.g., touch screen analog, but not shown) can be available on the exterior of the housing. In an aspect, this user interface can be password secured, allowing only authorized individuals access to the programming of the system 10. In additional aspects, the housing 100 can include known security means for access into the interior, including, but not limited to, sending a notification that the housing 100 of the system 10 has been opened.

Figure 4:
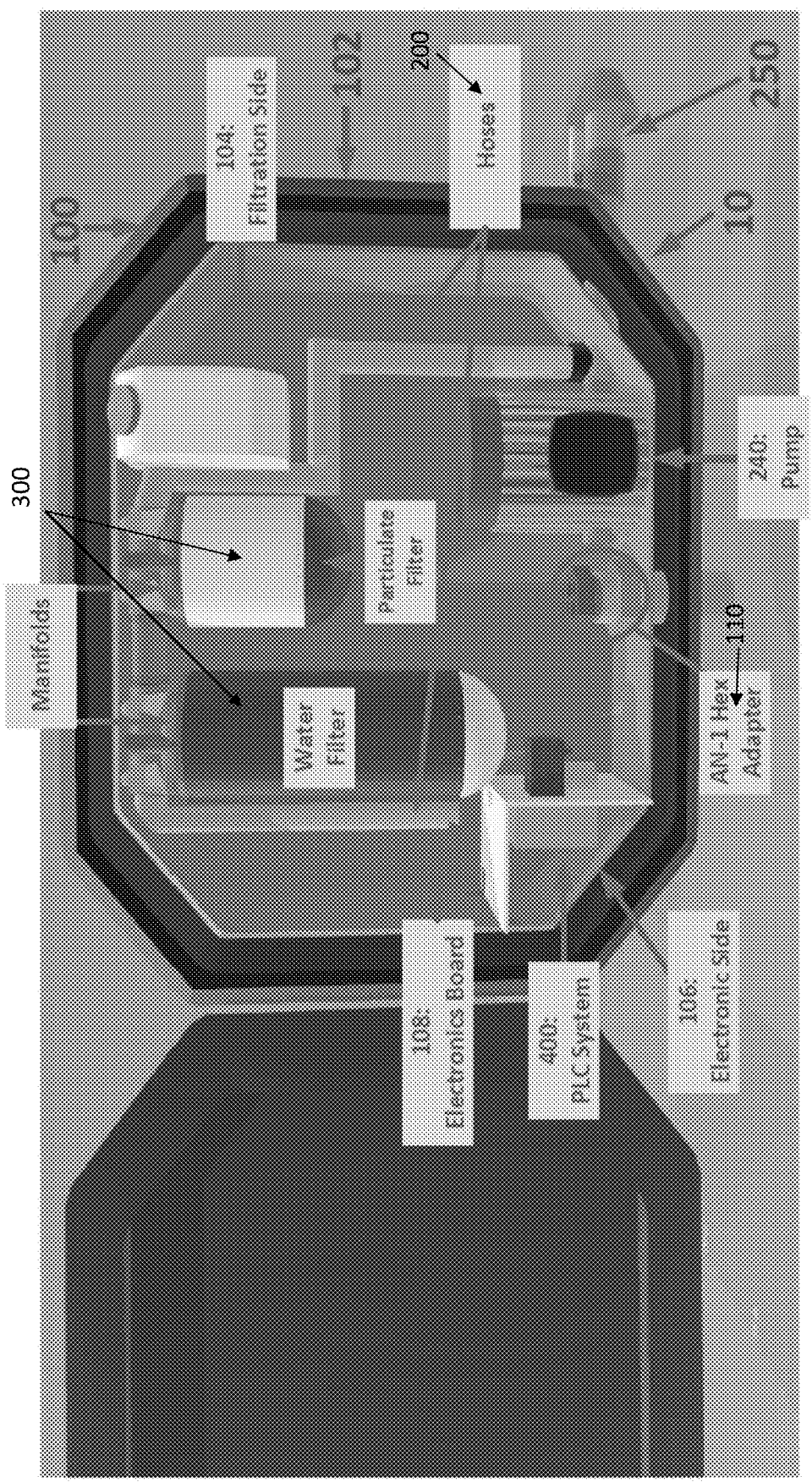
FIGS. 4-6 are interior views of the liquid container monitoring and maintenance system according to an aspect of the present invention.

As shown in FIG. 4, the interior of the housing 100 can be divided into two different components: the treatment section 104 and the control section 106. The treatment section 104 houses the components essential for the treatment of the liquid stored in the container 20. For example, the treatment section 104 includes a closed hose subsystem 200 and liquid treatment subsystems 300. The control section 106 can include the electronics necessary to control the components in the treatment section 104, as well as the computing device 400, discussed in more detail below. By keeping the hose subsystem 200 and liquid treatment subsystems 300 separate from the electrical components, and more specifically the PLC/computing device 400, the computing device 400 is prevented from being directly exposed to the liquid circulating through the hose 200 and liquid treatment subsystems 300. In addition, the sections 104, 106 can be divided by a dividing structure/electronics board 108. Electronic connections (e.g., connecting wires and inputs) between the components can extend over or through apertures (not shown) in the dividing structure/electronics board 108.

In addition, the housing 100 can come in various shapes and sizes. For example, the housing 100 can have a rectangular shape. In other examples, the housing 100 can maintain a rectangular shape while being rounded at the corners or a modified octagonal shape. In addition, the housing 100 can be curved near the edges and meet into flat edges. Such a design can increase the strength of the housing 100, be more aerodynamic, and provide flanges for securing means. However, in other embodiments, the shape of the housing can vary, and can include, but is not limited to cylindrical and cubical. In an aspect, the shape of the housing 100 can be adjusted to fit the dimensions of the space in which the LCMMS 10 is needed to be added.

Figure 5:
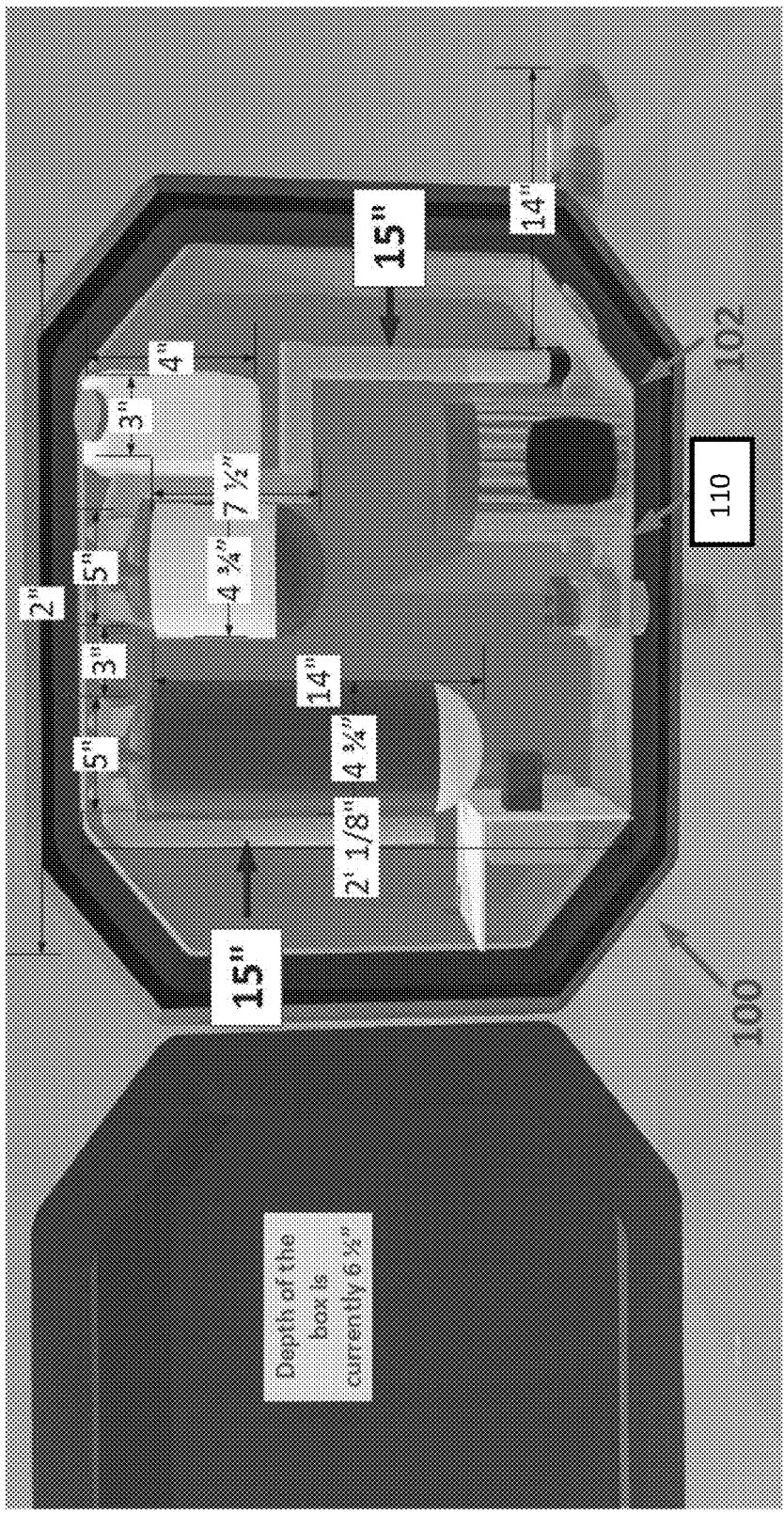
Figure 6:
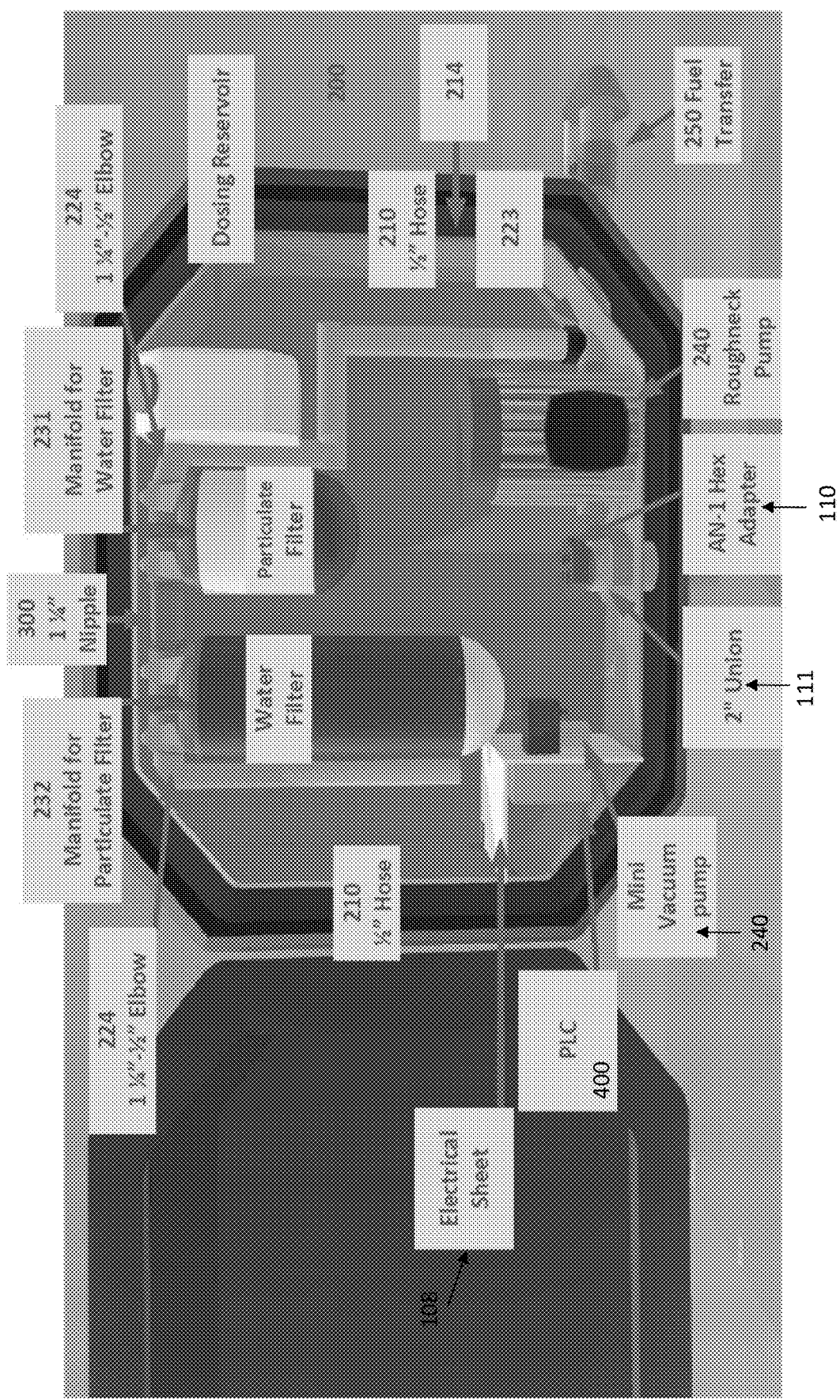

Along the same lines, the dimensions of the housing 100 can vary based upon the shape as well as the components contained within, as well as the subcomponents of the housing 100. For example, as shown in FIG. 5, the housing 100 includes a frame 102 used to create the majority of the treatment section 104. In an aspect, the frame 102 is approximately 21 inches in length, 19 inches in width, and 9 inches in depth. However, the dimensions of the housing 100 can vary. In an aspect, the electronics/control section 106 is configured to be smaller than the treatment section 104 to provide more room for filtration components while shielding the electronic components. While they can vary, the dimensions of the housing 100 should be configured to allow for adequate space within the interior to contain components of the LCMMS 10.

Figure 2A:
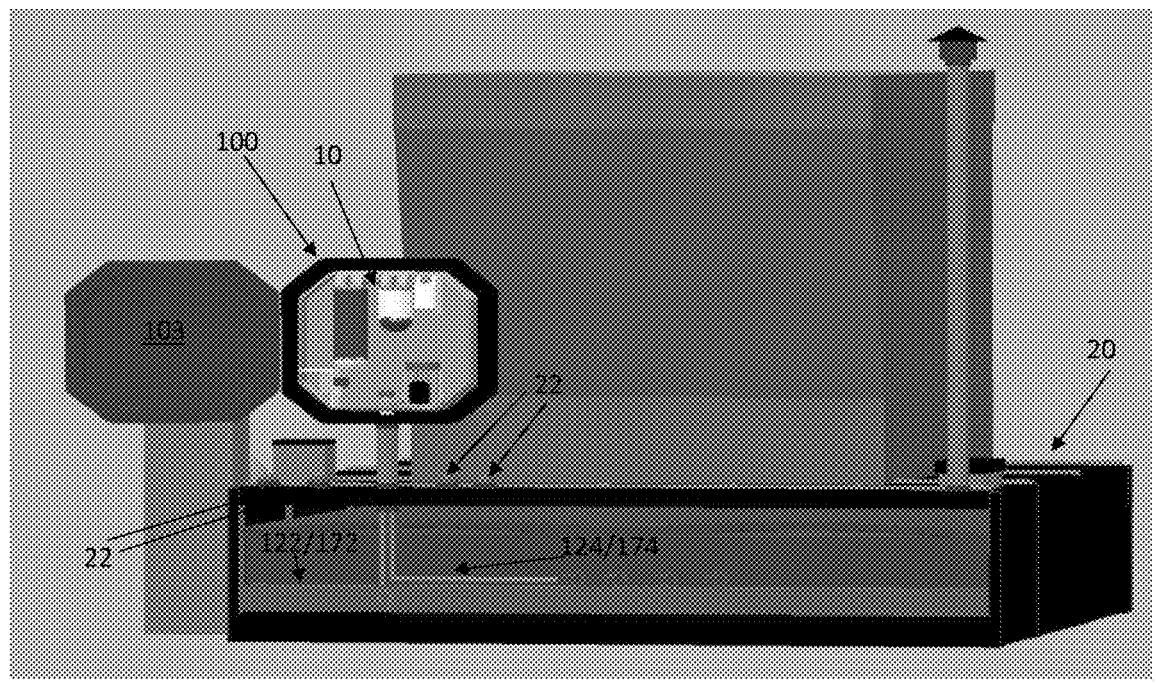
FIGS. 2a-b illustrate schematic representations of a liquid container monitoring and maintenance system and accompanying nitrogen system according to an aspect of the present invention.

In most instances, the LCMMS 10 is configured to have an access port adapter 110 oriented along the center of the bottom of the housing 100, and in the middle of the frame 104, which allows an intake pipe from the container 20 to be aligned along the center of the LCMMS 10, as shown in FIGS. 2 and 3. By keeping the access port adapter 110 at the middle, the LCMMS 10, and more specifically the housing 100, can be installed on the container 20 in a balanced fashion, keeping the weight of the LCMMS 10 evenly distributed. However, in some instances, given the location of an access port on the container, the access port adapter 110 of the LCMMS 10 cannot be located at the middle. In such instances, the housing 100 can include support legs 124 (see FIGS. 12*a-d*). The support legs 124 can be utilized by the housing 100 to secure and support the LCMMS 10 while connected to the liquid container 20. The support legs 124 can be adjustable. In one aspect, the support legs 124 can include pivoting feet 125 at one end that can be expanded and contracted on a surface. In addition, support legs 124 can be adjustable in length (e.g., telescopic, extensions, etc.). Such options allow the legs 124 to be adjusted to keep the housing 100, and therefore the interior components, level when the resting surface is not. The legs 124 can be permanently attached through various fastening means, or can be removably attached through various release means.

Figure 3A:
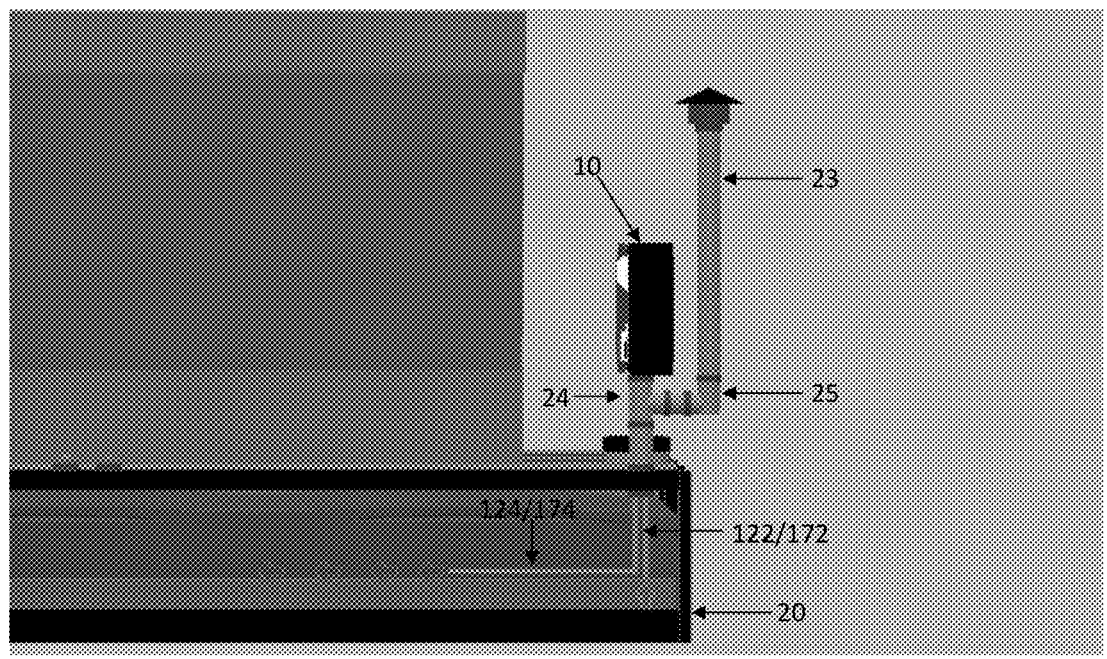
FIGS. 3a-b illustrate schematic representations of the liquid container monitoring and maintenance system of FIG. 2 mounted to a container in an alternative mount according to an aspect.
Figure 3B:
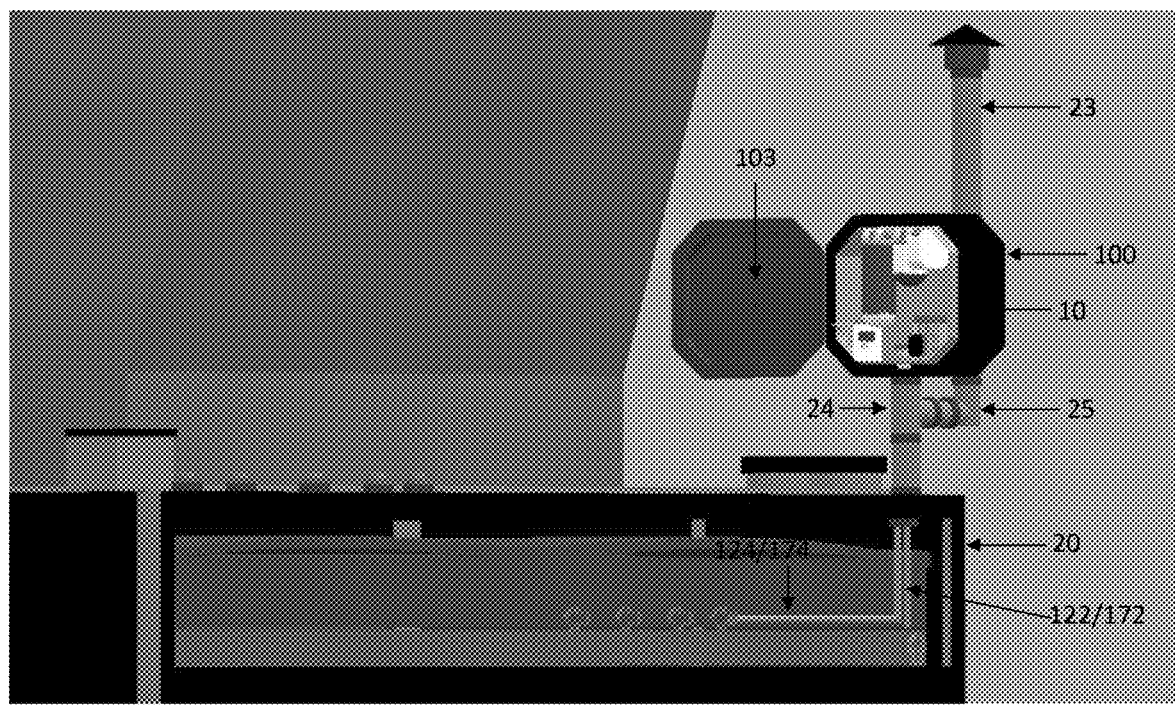

In another aspect, while the LCMMS 10 is configured to be connected to a container 20 at an access port 22 of the container 20, in some instances, there may not be an available access port 22. For example, all of the access ports 22 can be occupied, or the location of the access port 22 does not allow for the easy connection of the LCMMS 10. In such instances, the LCMMS 10 can be connected at a burp valve 23, as shown in FIGS. 3*a-b*. In such instances, a T-joint 24 can be mounted to the access port 22 currently occupied by the burp valve 23, with the LCMMS 10 connected at the other end of the T-joint 24. An elbow joint 25 can be connected to the middle portion of the T-joint 24, which allows the burp valve 23 to operate while providing a connection for the LCMMS 10. In such instances, the access port adapter 110, discussed below, will allow pressure inside of the container to release to the burp valve 23 and not leak into the LCMMS 10.

As discussed above, the LCMMS 10 is configured to be placed on the outside of the liquid container 20, thereby avoiding the need for preassembly or post fabrication of the liquid container 20 to include filtering/monitoring/dosing subsystems. In an aspect, the LCMMS 10 can be connected to various liquid containers 20 via access ports 22 of the liquid containers 20 (See FIGS. 1-2 and 11-12). In an aspect, the LCMMS 10 can include an access port adapter 110. The access port adapter 110 is configured to attach the LCMMS 10 to the liquid container 20, providing access to and from the interior of the LCMMS 10 and the interior of the liquid container 20. There is no need to drill a separate opening for the LCMMS 10. The access port adapter 110 can be configured to match with access ports 22 of various sizes, including, but not limited access ports with diameters ranging from approximately 1" to 8" and more in diameter. In an aspect, the access port 22 is large enough to allow multiple tubes to fit through into the interior of the container 20. In another aspect, it is possible for the LCMMS 10 to be connected to multiple access ports 22 of a container.

Figure 7A:
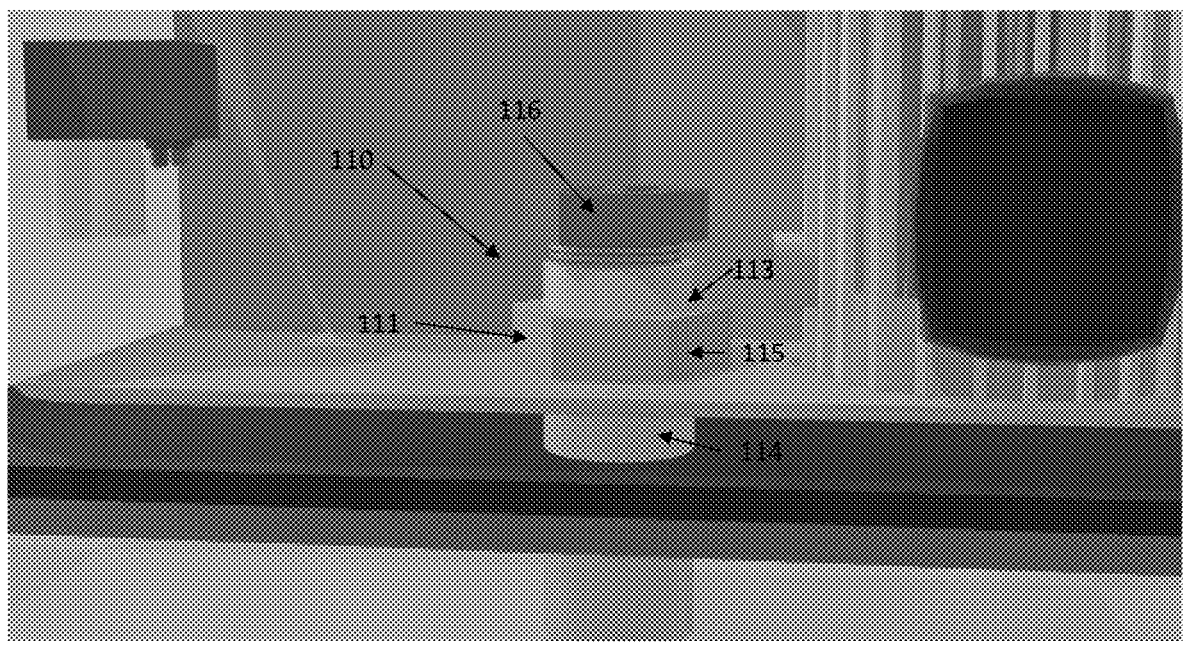
FIGS. 7a-b and 8a-b are perspective views of a component of the liquid container and maintenance system of FIGS. 4-6.
Figure 7B:
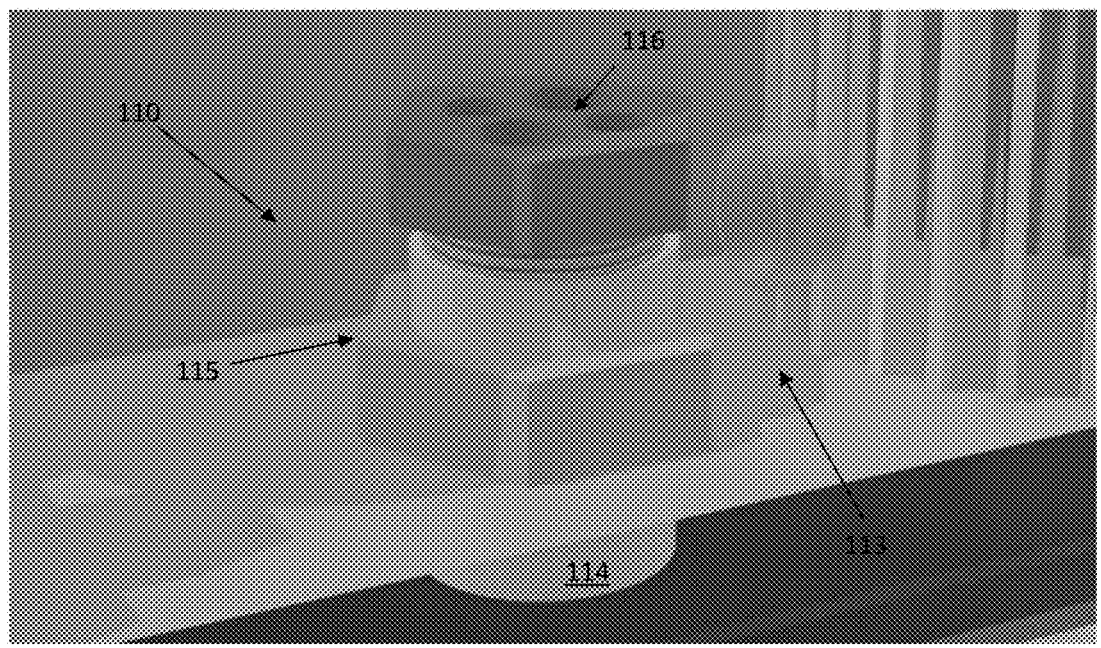
Figure 8A:
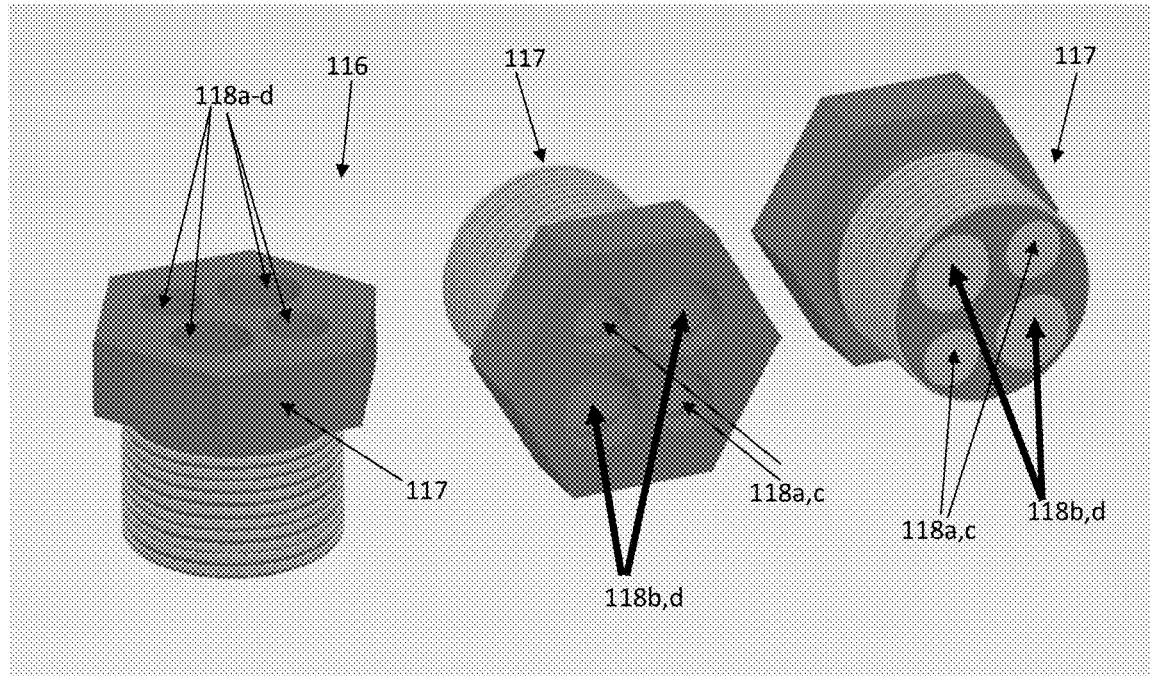
Figure 8B:
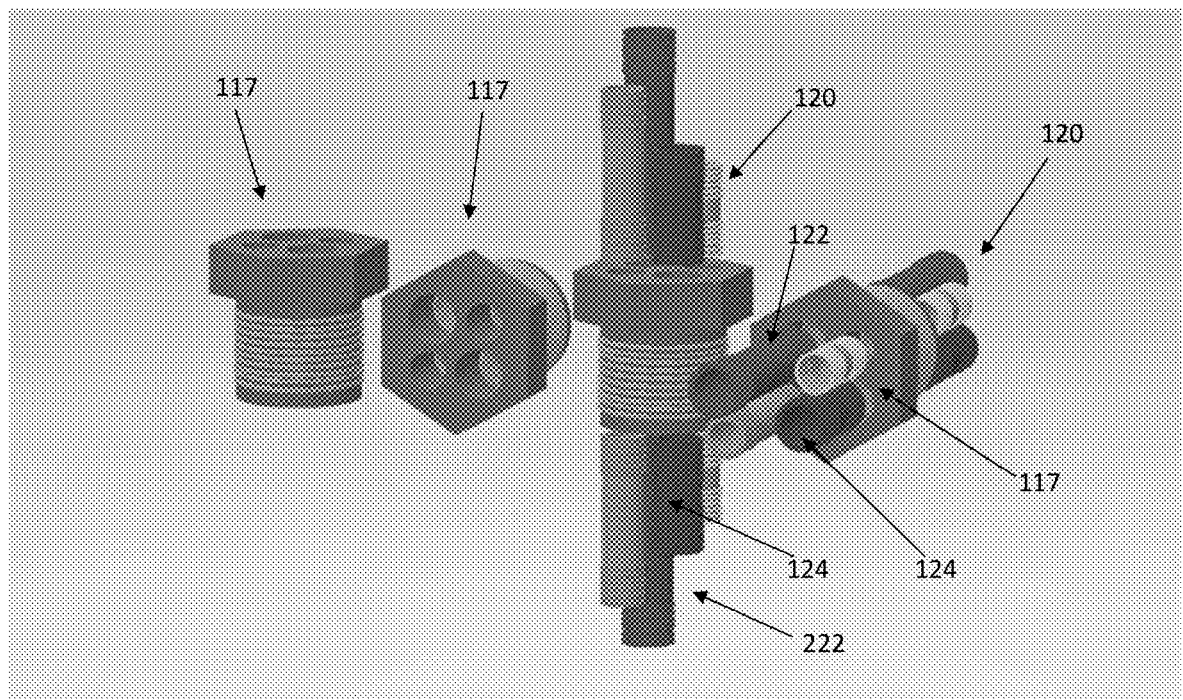

In an aspect, the access port adapter 110 can be coupled to an aperture extending through the housing 100 of the LCMMS 10. In an exemplary aspect, the access port adapter 110 can be threaded onto or into the housing 100 at the aperture (not shown). FIGS. 7-8 illustrate an example of the access port adapter 110. In an aspect, the access port adapter 110 can include a coupling means 111 that is connected to the housing 100. In such aspects, the coupling means 111 includes an aperture throughout that allows various liquid transporters (e.g., hoses) to enter into and exit out of the interior of the housing 100. For example, the coupling means 111 can include a union bolt 113 that includes a bottom portion 114, a middle portion 115, and a top portion 116. The middle portion 115 of the union bolt 113 can be fixed to the housing 100 through various known means, including, but not limited to, adhesives, welding, and the like. With the middle portion 115 secured to the housing 100, the bottom portion 114 and top portion 116 can be connected to the middle portion 115, allowing the housing 100 to swivel once connected to the access port 22 of the container 20. In addition, the union bolt 113 allows the housing 100 of the LCMMS 10 to have the ability to tighten down on to the container access port 22 and to have a wide range of pipes/hoses installed through the union bolt 113, while allowing the housing 100 to freely rotate to allow easy positioning and free movement of the piping/hosing into the container 20.

In addition, the top portion 116 of the union bolt 113 can be configured to be a pipe adapter 116. In an aspect, the pipe adapter 116 is a hex plug 117 with a plurality of apertures 118 extending through the length of the plug 117. In an aspect, the hex plug 117 is threaded on an outer surface, with the threading matching the threading found on the interior of the middle portion 115 of the union bolt 113, allowing the hex plug 117 to couple to the middle portion 115. In an aspect, the hex plug 117 can be 1 inch in length by 2 inches in width at the head. However, various hex plugs 117 of different dimensions can be used in other embodiments. It is preferable that the hex plug 117 have dimensions that allow it to couple easily with the middle portion 115 of the union bolt 113, as well as provide enough surface area for piping to extend through, discussed below.

In an aspect, the hex plug 117 is drilled and tapped to include 4 apertures 118*a*-*d*. In an aspect, the apertures 118*a*-*d* can be configured to receive and retain piping means 120, including an inlet pipe 122 and an outlet pipe 124, used by the LCMMS 10 and extended into the interior of the container 20, discussed in more detail below. In such aspects, the inlet pipe 122 and outlet pipe 124 can be nipples configured to engage hose of various other systems, discussed below. In an aspect, two different sizes of apertures 118 can be drilled. For example, two quarter inch apertures 118*a, c* and two half inch apertures 118*b, d* can be drilled through the hex plug 117. However, in other aspects, the apertures 118*a*-*d* can have different sizes. In an aspect, the apertures 118 can be threaded, with the piping means 120 including matching threading.

Figure 9:
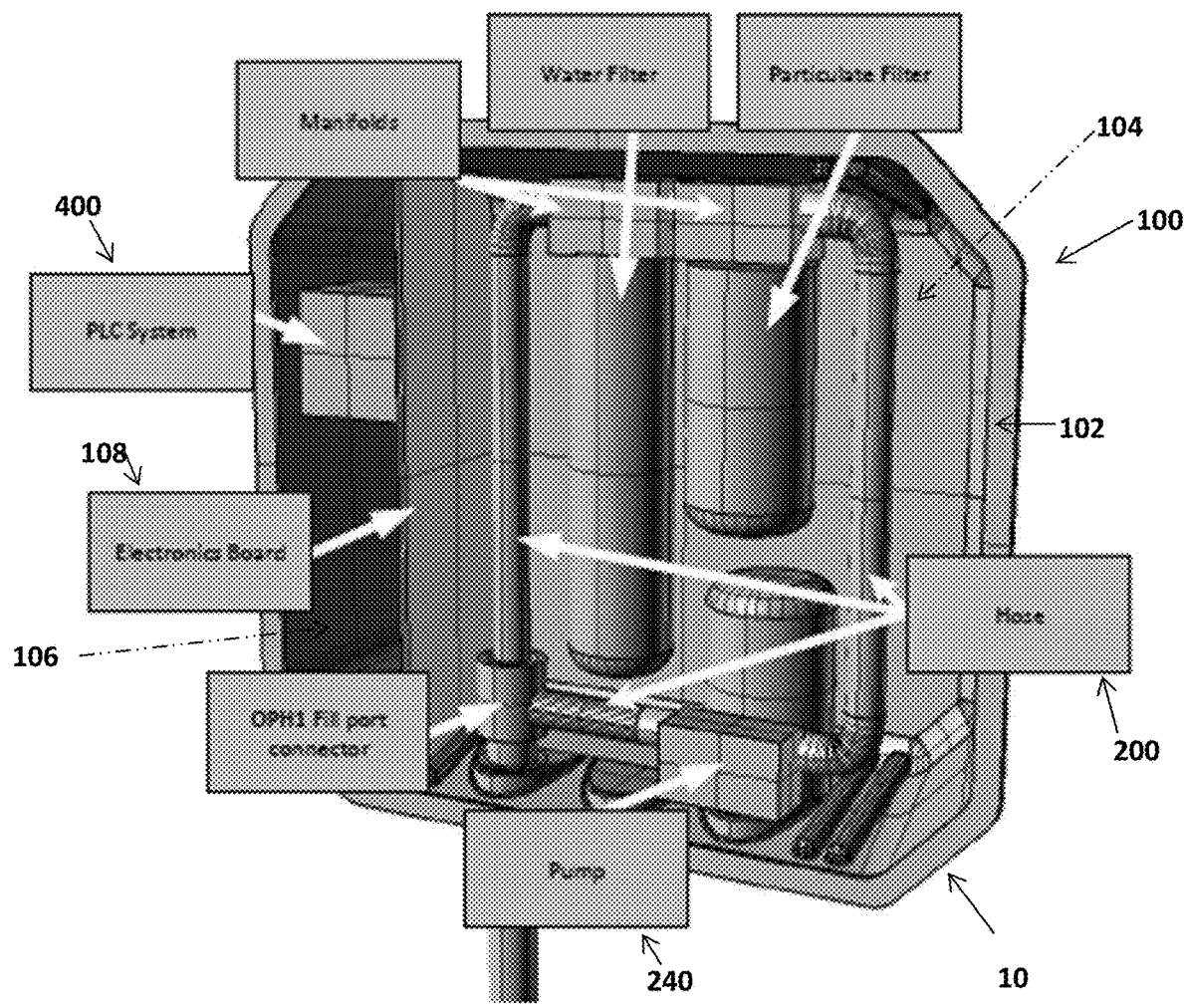
FIG. 9 is an interior view of a liquid container monitoring and maintenance system according to an aspect of the present invention.
Figure 10:
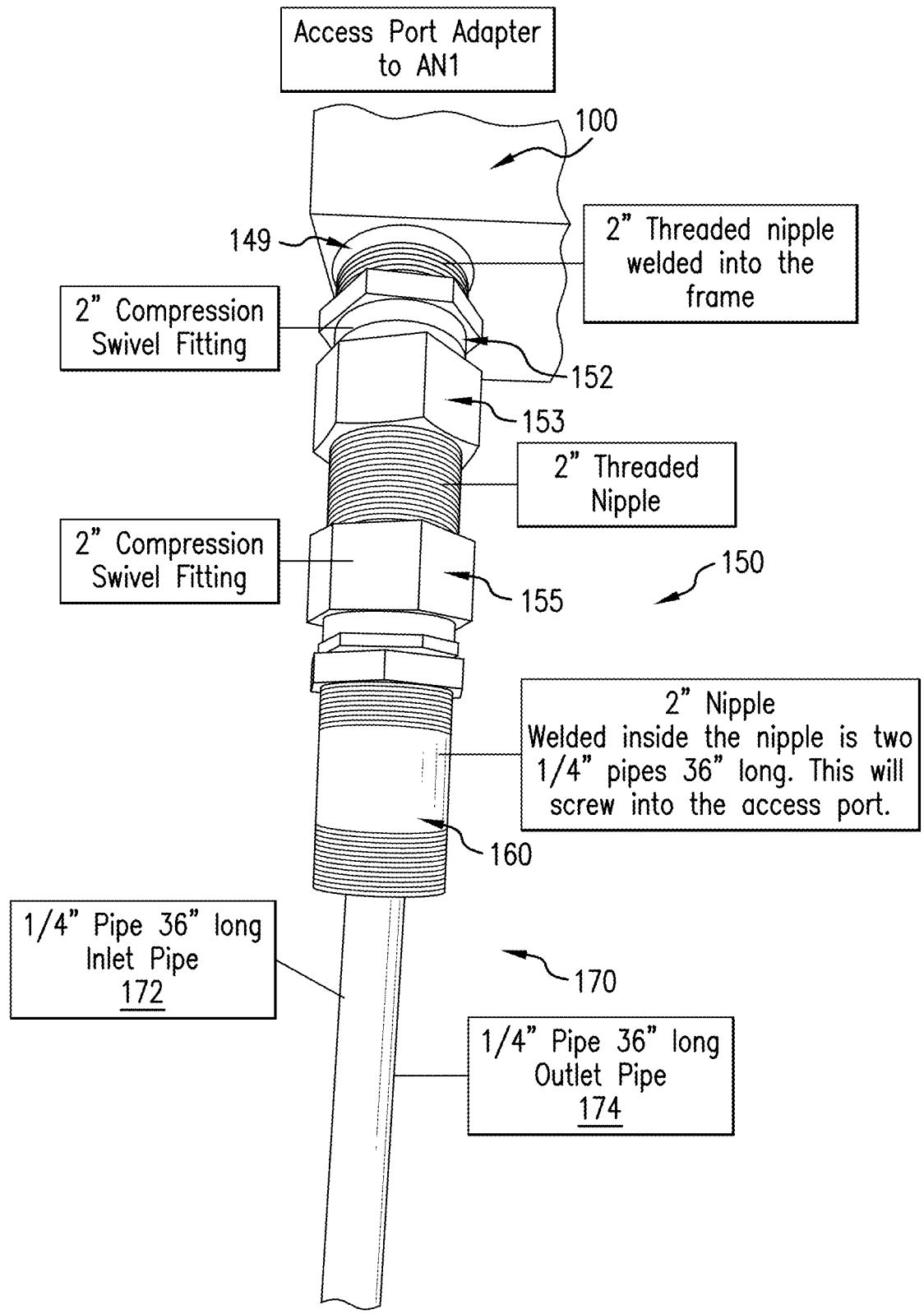
FIG. 10 illustrates components of an access port adapter of the liquid container monitoring and maintenance system of FIG. 9.

In other aspects, the LCMMS 10 can have an access port adapter 150 can have a different assembly. As shown in FIGS. 9-10, the access port adapter 150 can include coupling means 152, 160 at opposite ends, with one coupling means 152 configured to attach to the housing 100 and the other to attach/fit to the access port 22 of the container 20. A mating fastener 149 (e.g., threaded nipple welded into the housing) can mate with the coupling means 152 (e.g., a compression swivel fitting with a threaded end matching the mating fastener 149). Additional components can make up the access port adapter 150. For example, a combination of coupling devices (e.g., threaded nipples) can be used to connect the end coupling means 152, 160. The components of the access port adapter 150 can vary in dimensions from adapter to adapter. However, in each access port adapter 150, the components should have similar dimensions, especially at the ends in which coupling occurs. Also, various means of fastening (threaded, spring loaded, o-rings, etc.) can be used, but the fastening should be compatible with the adjacent components. In an exemplary aspect, the adapter 150 can utilize swivel connectors 153, 155 connected to threaded nipples on each end, which allows the adapter 150 to swivel when attached. The swivel connectors 153, 155 provide the benefit of allowing portions of the access port adapter 150 that extend into the interior of the tank, discussed below in detail, to be turned and moved within the tank 20. In addition, the LCMMS 10 can be attached without having to turn the housing 100, allowing a single individual to install, as opposed to requiring at least two individuals for installation.

In an aspect, the access port adapter 150 includes coupling means 160 configured to secure the access port adapter 150 to the liquid container 20 at an access port 22. For example, the access port adapter 150 can include a threaded surface 160 configured to engage a threaded surface of the interior (not shown) of the access port 22 of the liquid container 20. In other aspects, various other coupling means 160 can be utilized. However, it is preferable if the coupling means 160 provides for a connection that does not allow exterior elements to enter 100 the access port 22 or the interior of the housing 100.

In either case, the access port adapters 110/150 can also include tube means 120, 170 that allows for the intake and output of liquid from and to the liquid container 20 at the same time according to an aspect. As shown in FIGS. 7-8, the piping means 120 includes an input pipe 122 and an outlet pipe 124 that fit into the apertures 118*a, c* of the hex plug 115. As shown in FIG. 10, a duel path means 170 is provided and includes an inlet pipe 172 and an outlet pipe 174. In either, the inlet pipe 122, 172 and the outlet pipe 122, 174 are configured to extend into the interior of the liquid container 20 when connected to their respective adapters 110. In an aspect, the inlet and out let pipes 122, 172, 124, 174 extend approximately three feet into the interior of the liquid container 20. In an aspect, the ends of the inlet pipe 122, 172 and the outlet pipe 124, 174 are configured to be adjustable, allowing for the ends to be oriented in a 180 degree fashion (i.e., pointing in opposite directions). In another aspect, the ends of the inlet pipe 122, 172 and outlet pipe 124, 174 are pointed in the same direction and are in close proximity to one another.

The separate inlet and outlet pipes 122, 72, 124, 174 keeps the monitored and treated liquid from being mixed with the untreated liquid until the treated liquid reaches the interior of the liquid container 20, as well as help circulates the liquid within the container 20. In addition, the pipes 122, 124, 172, 174 extend into the interior of the housing 100, with the inlet pipes 122, 172 and the outlet pipes 124, 174 attached to different ends of a closed hose subsystem 200. In an aspect, the inlet pipes 122, 172 and the outlet pipes 124, 174 extend different distances into the interior of the housing 100. For example, the output pipe 174 can extend 4 inches further into the housing 100, allowing for easier connections of the closed hose subsystem 200 discussed in detail below. In an aspect, the tubing extending from the access port adapter 110 also includes a blanketing/bubbling tube (not shown), discussed in more detail below.

FIGS. 4-6, 9, 11-15 show a closed hose subsystem 200 according to an aspect of the present invention. The closed hose subsystem 200 is in communication with the access port adapter 110. In an aspect, the apertures 118 of the adapter 110 can receive various connectors to connect the piping from the container to other components of the LCMMS 10. For example, the adapter 110 can include an outlet connector 201 and an inlet connector 222 that engage the apertures 118 of the plug 117 and connect to the closed system 200, including the filtering system 300 (requiring two openings, an input and output), a connector 228 to a dosing system 350, and a connector 229 to a nitrogen system, as well as monitoring port 280 (e.g., with sensors to monitor conditions), as shown in FIG. 17 and discussed in detail below.

In an aspect, the closed hose subsystem 200 includes an intake end 202 and an outlet end 204. The intake end 202 and the outlet end 204 are configured to be in communication with the inlet pipe 122/172 and outlet pipe 124/174 of the access port adapter 110 respectively. In an aspect, the inlet pipe 122/172 and outlet pipe 124/174 extend into the interior of the LCMMS 10 and are respectively connected to the intake end 202 and outlet end 204 of the closed hose subsystem 200. By matching the intake pipe 122/172 and intake end 202 together, along with the outlet pipe 124/174 with the outlet end 204, a uni-directional flow of liquid is created. The closed hose subsystem 200 forces the untreated liquid pulled in from the container 20 to travel towards treatment subsystems 300. Once treated, the liquid is then pumped back into the container 200. In an aspect, the outlet pipe 124/174 extends further into the interior than the outlet pipe 122/174.

Figure 11:
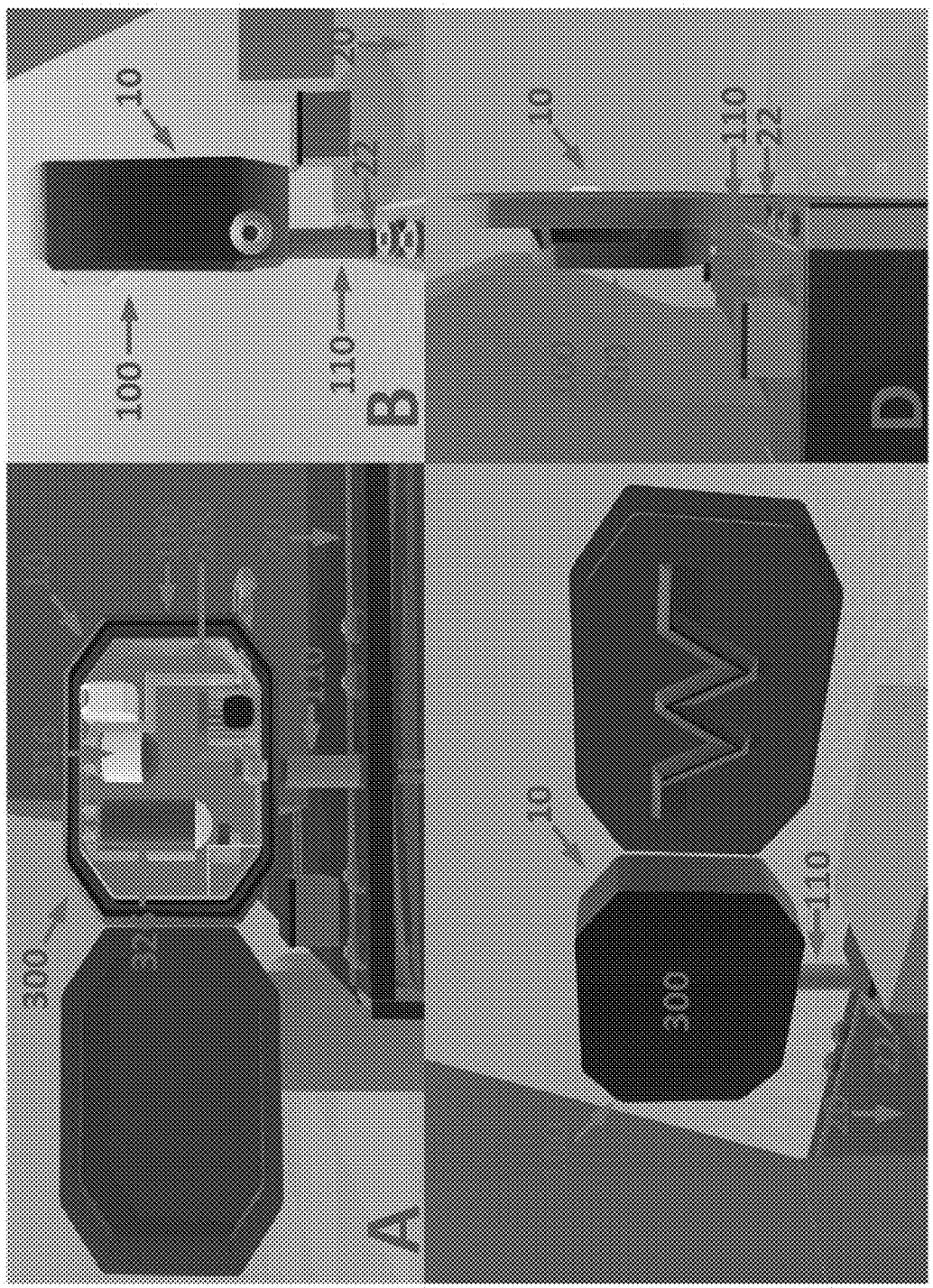
FIGS. 11a-d are front, back, and side views of components of the liquid container monitoring and maintenance system attached to a liquid container according to an aspect of the present invention.

In another aspect, as shown in FIGS. 11 and 11a-b, the inlet pipe 122/172 and outlet pipe 124/174 can include various connectors from the adapter 110 to connect to the closed system 200. The intake end 202 can be in communication with the inlet pipe 122/172 via an inlet connector 222. For example, the inlet pipe 112/172 can include a connector 222 that is configured to connect to the intake end 202 of the closed hose subsystem 200. In an aspect, the connector 2222 includes a compression fitting elbow 222. The compression fitting elbow 222 can be a swivel elbow 222 as well, allowing easy connection to the intake end 202 of the system 200.

Figure 17:
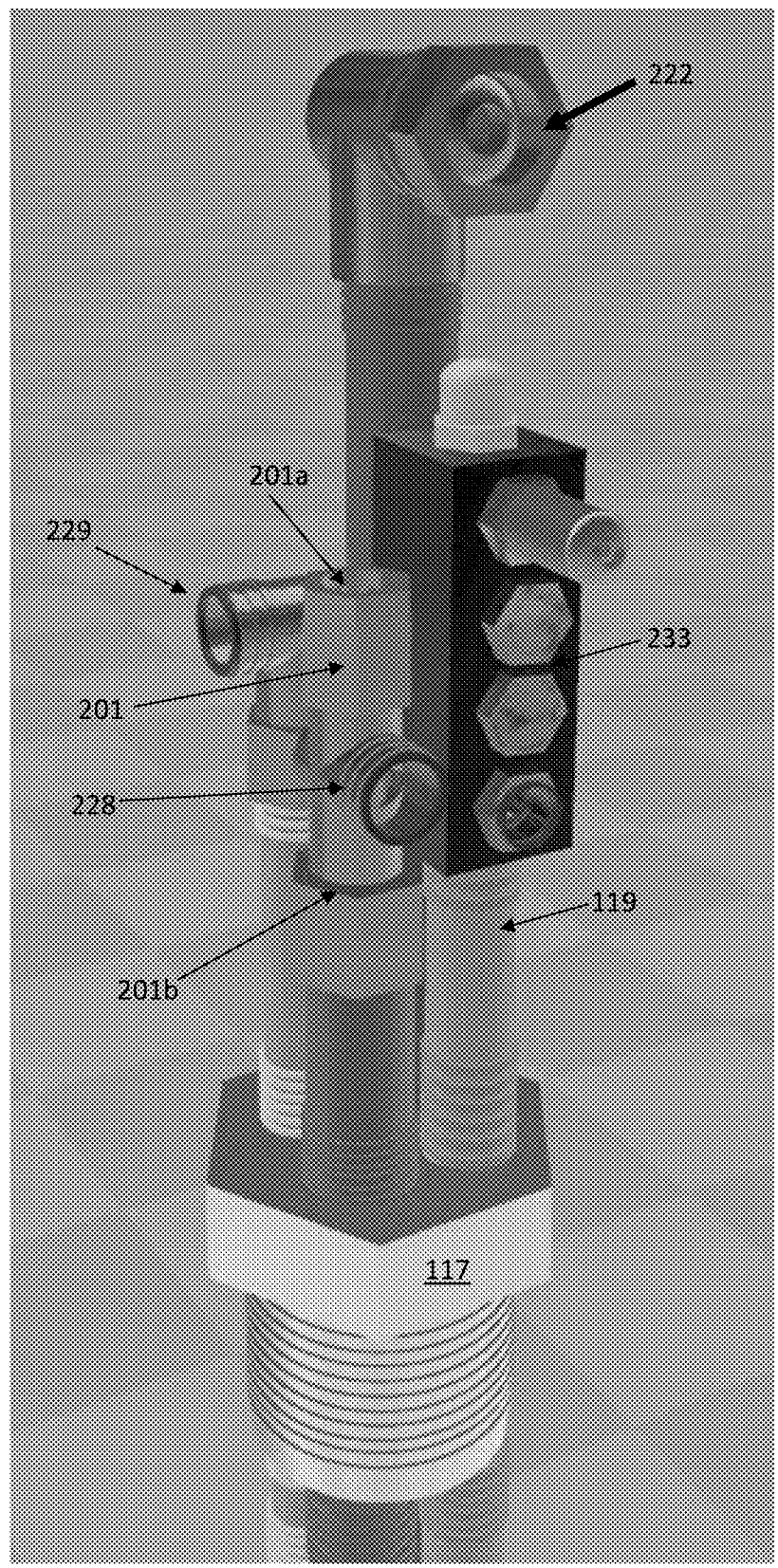
FIG. 17 illustrates a connector for all of the subsystems of FIGS. 13-15 according to an aspect.

As shown in FIG. 17, an outlet connector 201 is utilized to connect the end of the outlet pipe 124/174 to the outlet end 204 of the closed hose system 200. In an aspect, the outlet connector 201 can include a T-connector 201, with ends 201a, 201b connecting the outlet pipes 124/174 to the outlet end 204 of the closed hose system. The stem portion 228 can be connected to the dosing subsystem 350, discussed in more detail below. In an aspect, the compression T-connector 201 and elbow sleeve 222 will match the diameter of the pipes respectively, ½ inch as shown. However, in other aspects, other dimensions can be utilized. In another aspect, the adapter 110 includes a connector 229 for the nitrogen subsystem 380 discussed below. The connector 229 can include a shark bite compression elbow 229 that is sized to match the aperture 118 of the hex plug 117 and the piping of the nitrogen system 380.

Figure 18:
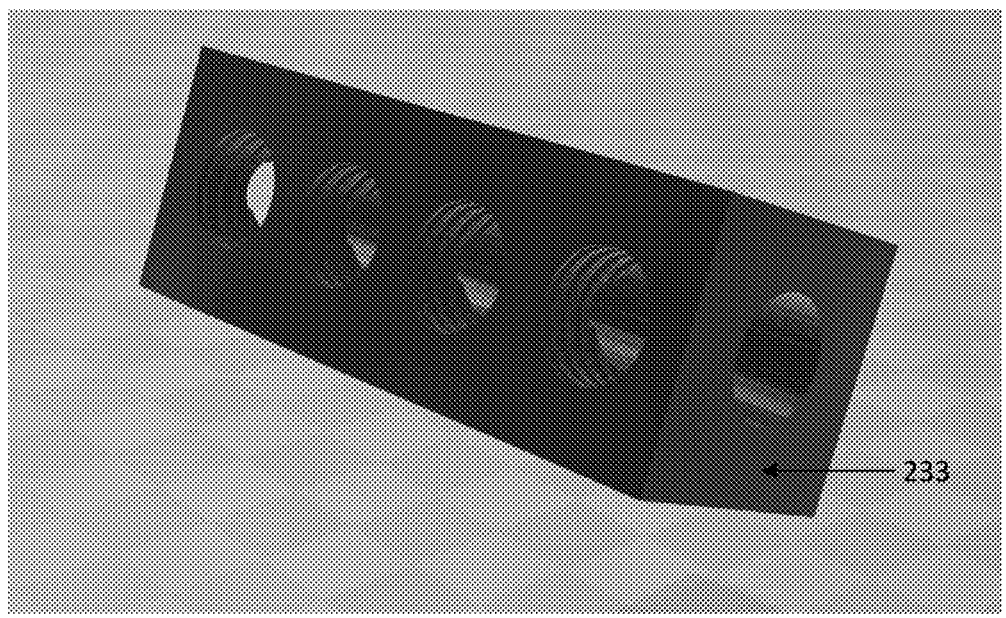
FIGS. 18-19 illustrates manifold used by the system according to an aspect of the present invention.
Figure 19:
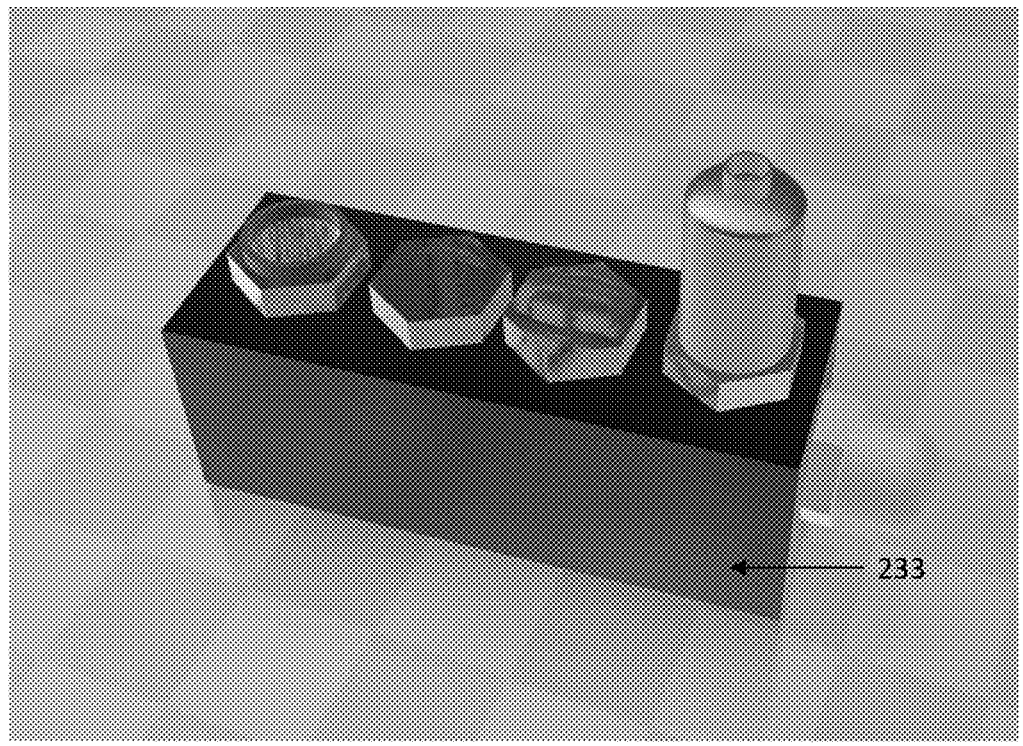

In another aspect, as shown in FIGS. 17-19, the adapter 110 includes a technology aperture 118 that is configured to receive a connector 119 and a technology manifold 233 with ports. The manifold 233 can be configured to allow various sensors to have access to the environment of the container in order to monitor the pressure, humidity, temperature, and other environmental characteristics of the container. In an aspect, the manifold 233 will contain a 6-port manifold. In another aspect, the manifold 233 can also include a connector allowing a camera to be placed into the container for visual monitoring. In such aspects, the camera can be a small plumbing/snake like camera which can be installed into the manifold technology port, and connect to the PLC and can be configured to show a live feed inside of the tank. In an aspect, the manifold 233 can be configured to be in communication with the PLC 400, discussed in detail below.

In an aspect, the transfer of liquid into and out of the container 20 by the LCMMS 10 will transfer enough volume of liquid to create a figure eight motion of liquid within the container 20, moving all fluid within the container 20 and assisting in filtration. In an aspect, every embodiment of the LCMMS 10 is capable of causing such a flow to occur, whether the container is a 100 gallon tank, up to over millions of gallons of fluid. In such aspect, the components of the LCMMS 10 can be configured via shape (i.e., diameter of the hosing of the hosing system 200 and tubing means 130), as well as power supplied (e.g., a pump or some other fluid moving means) to meet the individual requirements of the various sized liquid containers 20.

In an aspect, the closed hose subsystem 200 is oriented to run along the interior perimeter of the housing 100 of the LCMMS 10. The closed hose subsystem 200 can be comprised of various components. The closed hose subsystem 200 can include various hose members 210, couplers 220, manifolds 230, and pumps 240. For example, couplers 220 can be used to connect the inlet and outlet pipes to hose members 210. By using various types of couplers 220 with a plurality of hose members 210, the integrity of the hose members 210 can be preserved. In other words, the hose members 210 are kept in relatively straight alignment without bending them, preserving the structural integrity of the hose members 210. In an aspect, the hose members 210 can be comprised of various materials, including, but not limited to, stainless steel, thermo polymers, and the like. In an aspect, the hosing members 210 are comprised of flexible hosing. In an aspect, the hosing includes 2500 psi rated industrial hose, which range approximately ¼ inch to 1 inch in diameter and are flexible.

Figure 13:
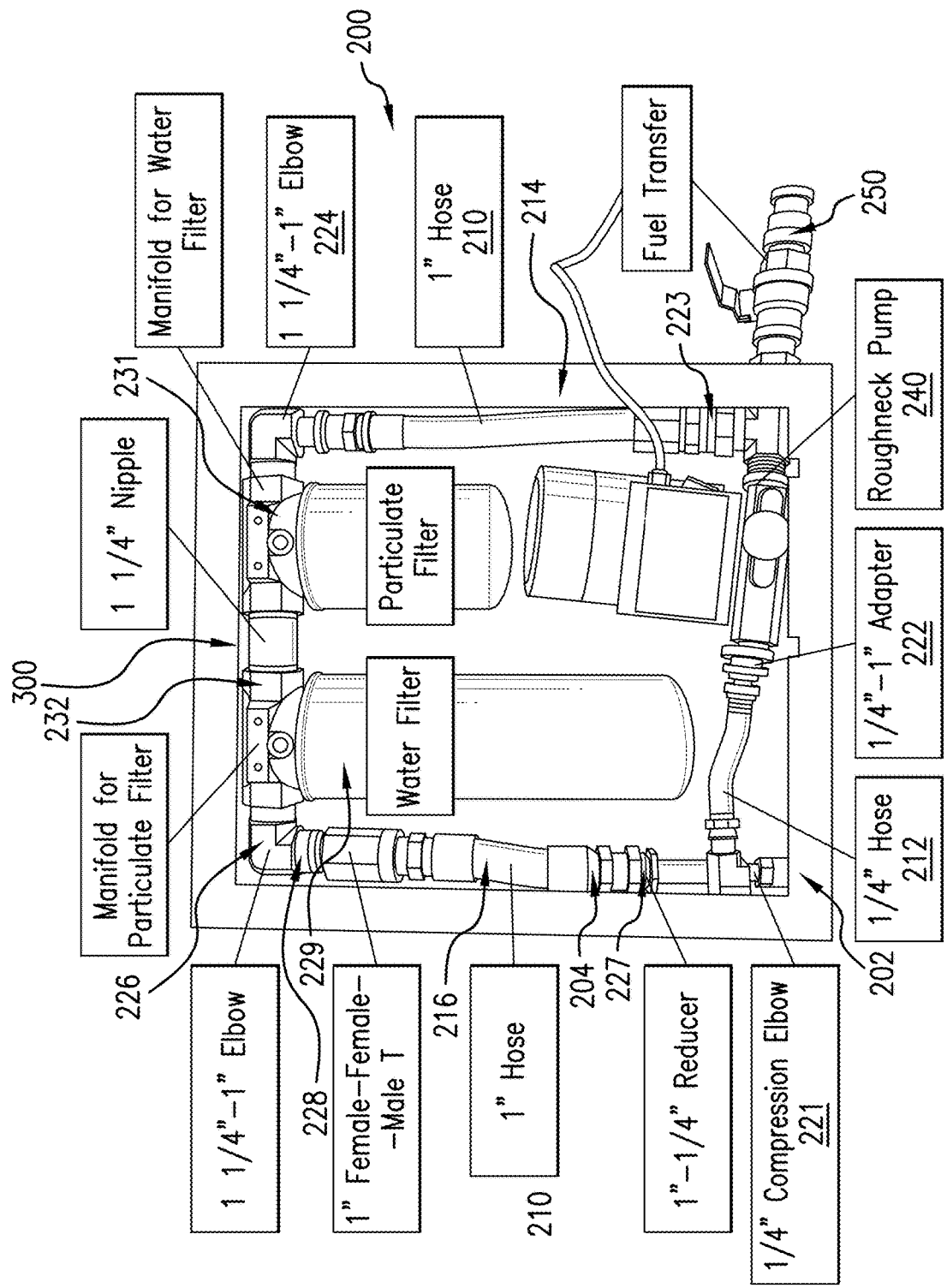
FIG. 13 is a schematic representation of a filtering subsystem of a liquid container monitoring and maintenance system according to an aspect of the present invention.

The inlet pipe 122 is connected to the closed hose subsystem 200. cAs shown in FIG. 13, an elbow coupler 221 can connect the inlet pipe 122 (not shown) to a first hose member 212. From there, the first hose member 212 can be connected to another connector/adapter 222 for communication with a pump 240. In an aspect, the pump 240 is configured to pull liquid through the closed hose subsystem 200. In an exemplary aspect, the pump 240 is configured to pull the liquid through the hose subsystem 200 in one direction. While in other aspects, a bi-directional pump 240 can be utilized, but in hose systems 200 where a certain liquid path is desired (i.e., the liquid passes through filtration/treatment systems in a desired order), a uni-directional pump 240 is desirable. A diaphragm pump can be utilized. In an aspect, the pump 240 can include a GPM diesel pump (e.g., supplied by Roughneck). However, various other pumps 240 can be utilized by the LCMMS 10. The pump 240 utilizes the same power source(s) (not shown) of the LCMMS 10. For example, the power source can be a connection to an electrical grid, a battery, and various other sources and combinations thereof. In an aspect, the power source can include a 110 v source and a solar power sources and batteries. By having a backup source, such as solar power and backup battery, the LCMMS 10 can operate independently of a power grid in cases when the power grid fails.

Returning to the closed hose subsystem 200, the pump 240 can be attached to either an elbow connector 223 or a t-connector 223. At the very least, the connector 223 connects the pump 240 to a second hose member 214. In the case of the t-connector 223, an additional connection is made to an exterior valve 250 that can be used for fuel transfer. To run the fuel transfer from tank to tank, one must connect the hose to the quick connect, run the hose to the desired tank, insert the output end of the hose to the fuel port or emergency vent, open up the check valve and turn the system on from the PLC system. The fuel transfer valve 250 allows individuals to gain access to the fuel stored in the container 20 for testing purposes, as well as being able to transfer fuel from one container 20 to another. From here, the second hose member 214 is connected to an elbow connector 224. The t-connectors and elbow connectors 223, 224 allow the closed hose subsystem 200 to turn within the housing 100. A first manifold 231 can be connected to the elbow connector 224, with the first manifold 231 being connected to a second manifold 232 via another connector 225 (i.e., a nipple). The second manifold 232 is connected to a second elbow connector 226, which connects a third hose member 216. Additional connectors 227, 228, 229, including a reducer 227, can be used to attach the third hose member 216 to the outlet pipe 134. In an aspect, the size of the hose members 210 can be larger than the inlet pipe 122 and the outlet pipe 124, requiring the reducer 227 to be used. The other connectors 228, 229 allow communication between the reducer 227 and the third hose member 216, while also providing means for connecting additional systems, including a dosing system 350 and a blanketing system 380, discussed below.

The foregoing describes various components of a hose subsystem 200 according to one aspect of the present invention. Various other components can be used, as well as the order of such components can be utilized to form hose systems 200 of other aspects. In an aspect, the components can range in diameter sizes. For example, the connectors can include, but are not limited to, ¼ inch by 2 inch nipples (connecting the manifolds together), 1¼ inch male 1 inch elbows (connecting the manifold to the input hose), 1¼ inch male to 1 inch female connectors (connecting the output side of the manifold to the T joint), 1 inch jic-straight-straight T connectors (allows for a dosing unit, discussed below, to connect into the output side and connects to the output hose), and 1 inch to ¼ inch reducers. The reducer can be necessary because the size of the diameter of the container access ports 22 may limit the size of the inlet pipe 122 and output pipe 124. However, in other aspects, hosing of various diameters, lengths, and the like can be used. In other words, the diameter and length of the hosing members 210, couplers 220, manifolds 230, and pumps 240 is determined by the amount of liquid contained in the container 20 (i.e., the size of the container).

As discussed above, the closed hose subsystem 200 allows for the liquid to travel to the liquid treatment subsystems 300. In an aspect, the liquid treatment subsystems 300 include a filtration subsystem 310 (see FIGS. 2-4 and 14), a dosing unit subsystem 350 (FIG. 15), and a nitrogen blanketing/bubbling subsystem 380 (FIG. 16). These subsystems 310, 350, and 380, controlled by the computing device 400, discussed below, treat the liquid within the container 20 to prolong the life of the liquid and prevent its contamination, as well as prevent damage to the container 20.

The liquid treatment subsystems 300 are connected to the closed hose subsystem 200 via the manifolds 230 (e.g., 231, 232) and other connectors 201, 222, 228, 229. In an aspect, the filtration subsystem 310 is configured to filter contaminants from the liquid of the container 20. The types of filter subsystems 310 utilized are dependent on the liquid being stored within the container 20. For example, if the container 20 is diesel, particulate and water filter subsystems are used to remove particulate and water to prolong the life of the diesel fuel.

Figure 14:
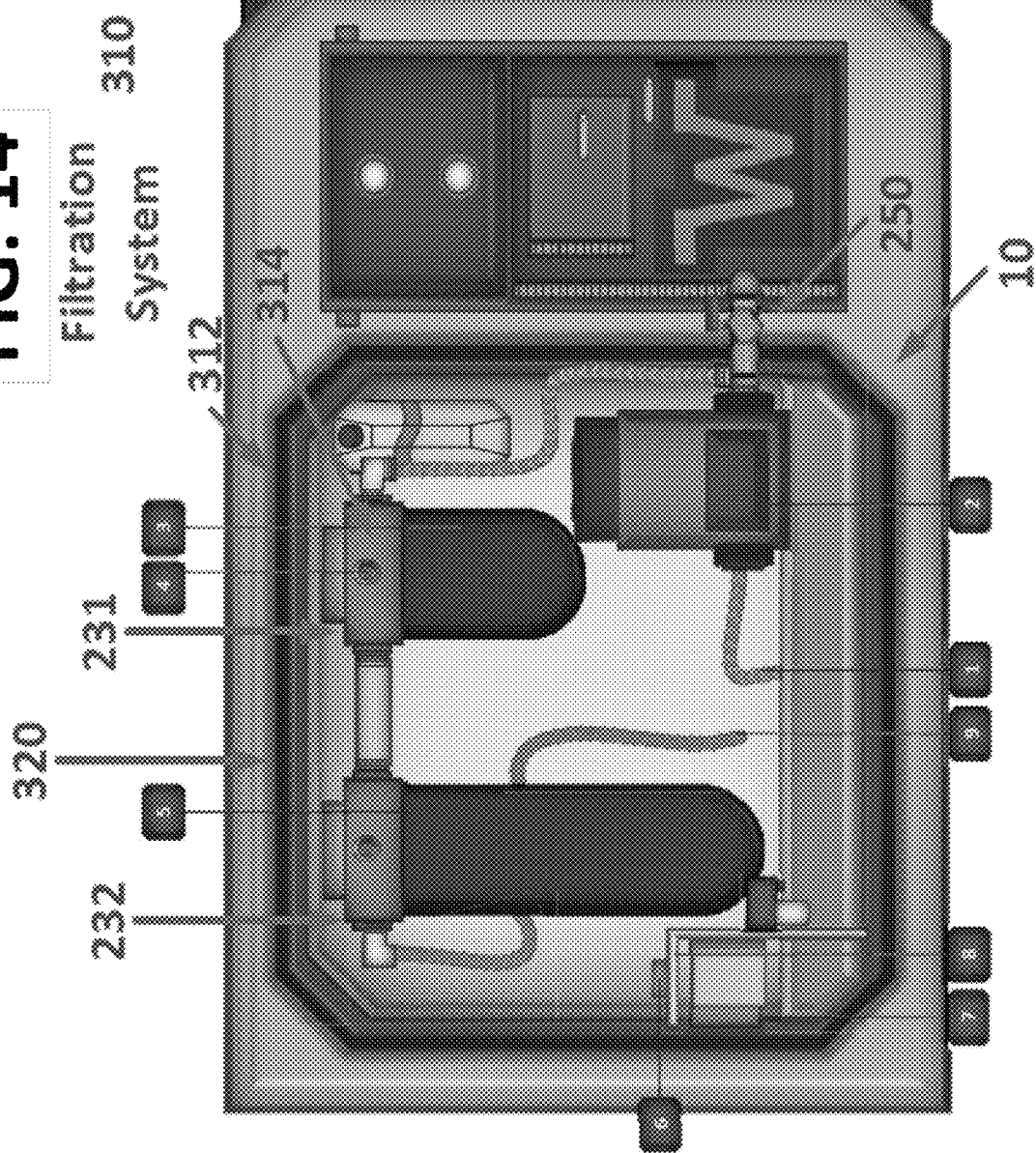
FIG. 14 is a schematic representation of a filtering subsystem according to another aspect of the present invention.

FIGS. 1-9 illustrate a LCMMS 10 directed to protecting diesel containers. As shown in FIGS. 13-14, the manifolds 231, 232 connect the filtration subsystem 310 to the closed hose subsystem 200. In an aspect, the filtration subsystem 310 includes a particulate filter subsystem 312 and a water filter subsystem 320. As the diesel is pumped through the closed hose subsystem 200, it passes through the manifolds 231, 232 which are connected to the particulate and water filter subsystems 312, 320 respectively. The manifolds 231, 232 pass the diesel to the filters 316, 326 of the respective subsystems 312, 320, which remove the particulate and water from the diesel, before returning the diesel to the closed hose subsystem 200. As shown, P560330 manifolds 231, 232 can be utilized for filter heads. A DBB8666 particulate filter 316 and a DBB0248 water filter 326, all supplied by the Donaldson company, can be utilized. However, other heads and filters supplied by other companies can be used for water and particulate filtering. While in other embodiments the water filter subsystem 320 can be placed upstream the particulate filter subsystem 312, placing the particulate filter subsystem 320 upstream removes the particulate before going into the water filter 326.

While the filtration subsystem 310 described above is directed to treat diesel, other liquids can be treated in other embodiments of the present invention. For example, if the container 20 holds water and/or air, a particulate filtration subsystem and a biological filtration subsystem can be used. Various other filtration subsystems can be used based upon the liquid contained.

Figure 15:
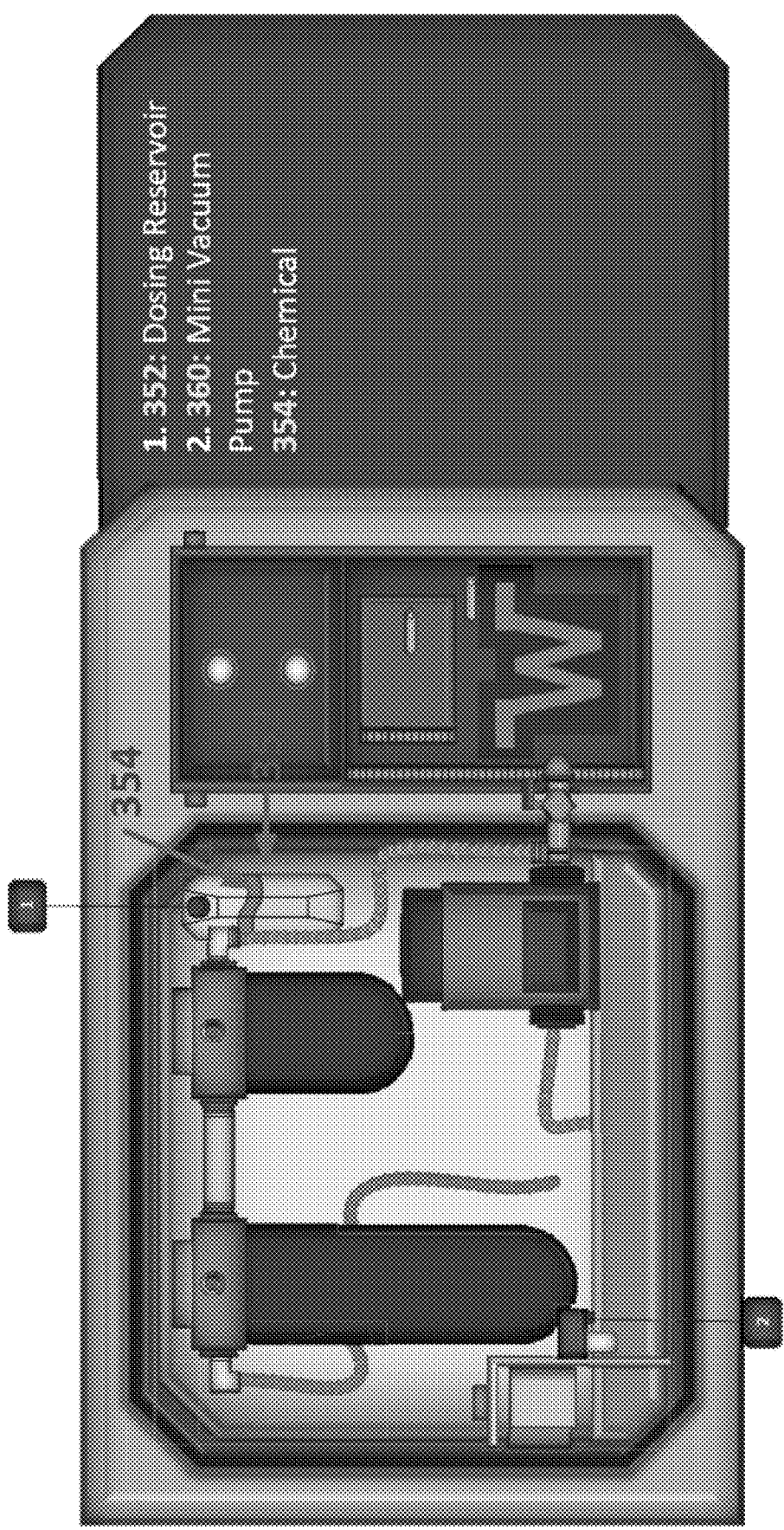
FIG. 15 is a schematic representation of a dosing subsystem of a liquid container monitoring and maintenance system according to an aspect of the present invention.

FIG. 15 illustrates a dosing unit subsystem 350. Such dosing unit subsystems 350 can be used to apply chemicals or some type of additive to the stored liquid of the container 20. In an aspect, the dosing unit subsystem 350 can be contained within the housing 100 of the LCMMS 10. In other aspects, the dosing unit subsystem 350 can be a separate unit not found within the housing 100, but still connected to the closed hose subsystem 200. The dosing unit 350 subsystem can include a reservoir tank 352 containing the additive/chemical 354. The reservoir tank 352 is connected to a pump 360. The pump 360 is connected to a combination of valves. The valves can then be connected to the closed hose subsystem 200 via a connector 228. In an aspect, the pump 360 can be similar to the pump 240 utilized by the closed hose subsystem 200. In an aspect, the pumps 240, 360 can be different pumps. In another aspect, both systems 200, 350 can utilize the same pump, which would require the pump to have various inputs and interior paths to keep the liquids separate. However, in a preferred embodiment, the additive is added to the liquid after being treated by the filtration subsystem 310, so a separate pump 360 is used. In an aspect, the dosing unit subsystem 350 is separated from other components of the LCMMS 10 by a divider, but contained within the housing 100.

As shown in FIG. 15, the dosing unit subsystem 350 is configured to add an additive to the diesel. In an aspect, the chemical can include a chemical biocide, which kills/prevents remove microbial growth. However, other chemicals can be added. In addition, in other aspects, more than one additive/chemical can be added by the dosing unit subsystem 350. In such instances, multiple reservoir tanks holding different additives can be utilized. In such cases, various valves can connect the reservoir tanks to the pump.

Figure 16A:
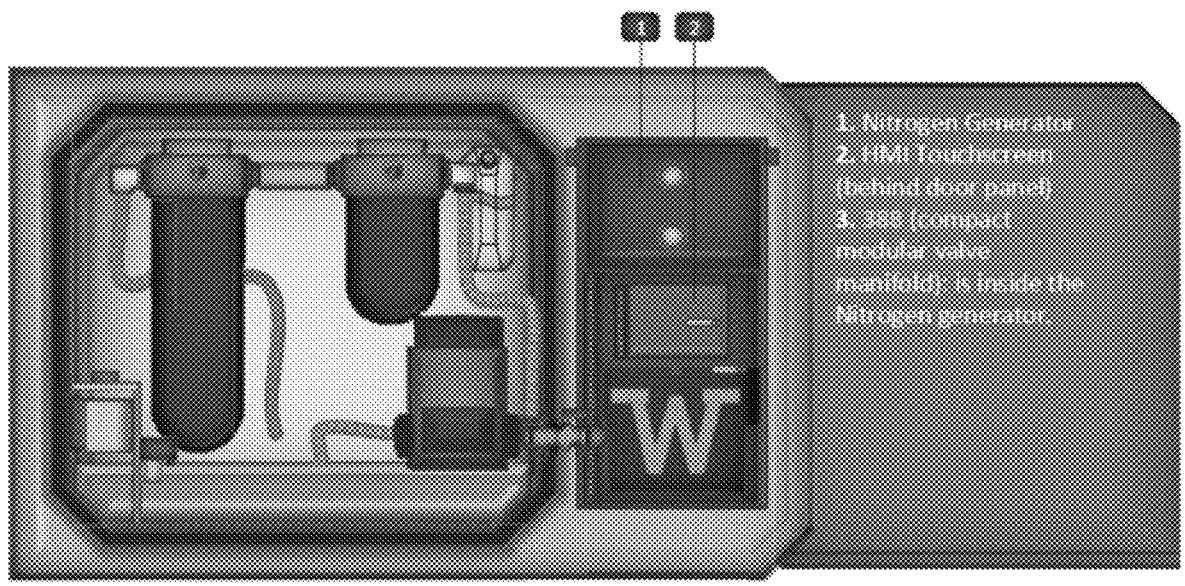
FIGS. 16a-b are schematic representation of a blanketing/nitrogen subsystem of a liquid container monitoring and maintenance system according to an aspect of the present invention.
Figure 16B:
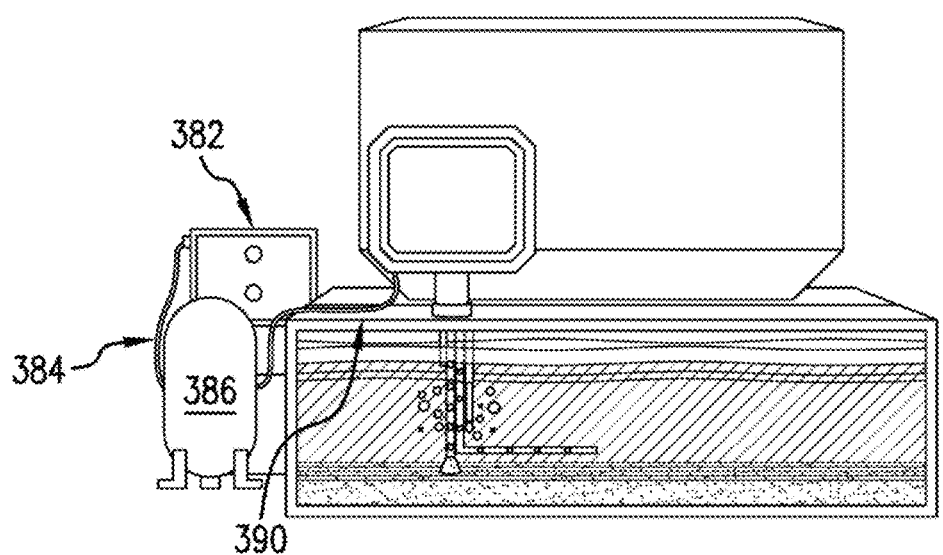

FIGS. 16a-b illustrate a blanketing/bubbling subsystem 380. As discussed above, the LCMMS 10 illustrated in FIGS. 1-16 are directed to the treatment and monitoring of diesel. In such aspects, the blanketing/bubbling subsystem 380 comprises a nitrogen bubbling/blanketing subsystem 380, which produces nitrogen. The blanketing/bubbling subsystem 380 is configured to eliminate condensation by removing condensation by way of inertion and or bubbling effect either pressurized or not. However, in other aspects, other types of inert gases can be utilized.

Figure 12:
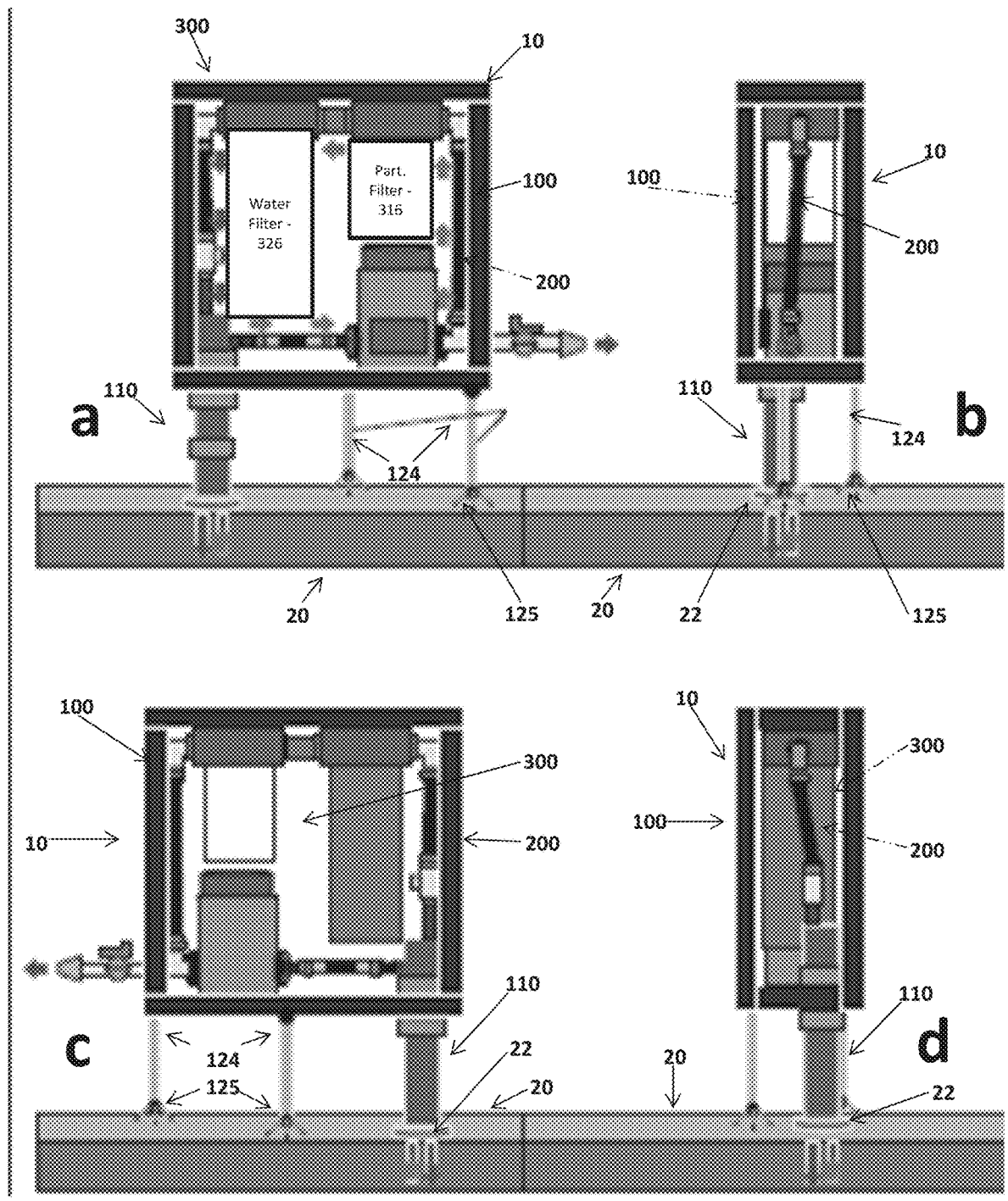
FIGS. 12a-d are front, back, and side exterior views of the liquid container monitoring and maintenance system attached to a liquid container according to an aspect of the present invention.

In an aspect, multiple LCMMS's 10 can be utilized to treat several liquid containers 20 in the same vicinity/site (see FIG. 12). In such aspects, a single blanketing/bubbling subsystem 380 can be utilized for all of the LCMMS 10 used. Further, a single LCMMS 10 can be configured to be a master LCMMS 10 to control the function of the LCMMS 10. For example, the LCMMS 10 controls the programming (discussed below) for the remaining LCMMS 10, as shown in FIG. 12. In such cases, the master LCMMS 10 can control the dosing and blanketing/bubbling for all of the LCMMS 10.

In an aspect, the subsystem 380 utilizes blanketing. Blanketing is performed to prevent a vacuum from developing when liquid is removed from a tank to prevent other liquids, including air, from entering the tank. Further, blanketing is done to maintain a desired pressure within a tank in the case of temperature changes. Blanketing can occur by pumping in the inert gas into the top of the container 20. In an aspect, the subsystem 380 utilizing bubbling. Bubbling provides the same benefits as blanketing, but the inert gas is added at the bottom of the container, which also has the benefit of disturbing the liquid (e.g., diesel fuel). In an aspect, when nitrogen is used, water molecules and other particulate can attach to the nitrogen, and move to the top of the liquid. In one aspect, the nitrogen inerts into the bottom of the Fuel tank at 20 PSI. When it begins to bubble up, it will allow the Nitrogen to create pressure inside of the tank at 10 PSI, disrupting the bottom of the tank. In another aspect, the nitrogen inerts into the bottom of the Fuel tank at 5 PSI. When it begins to bubble up, it will allow the Nitrogen to create pressure inside of the tank at 2 PSI, disrupting the bottom of the tank.

Figure 2B:
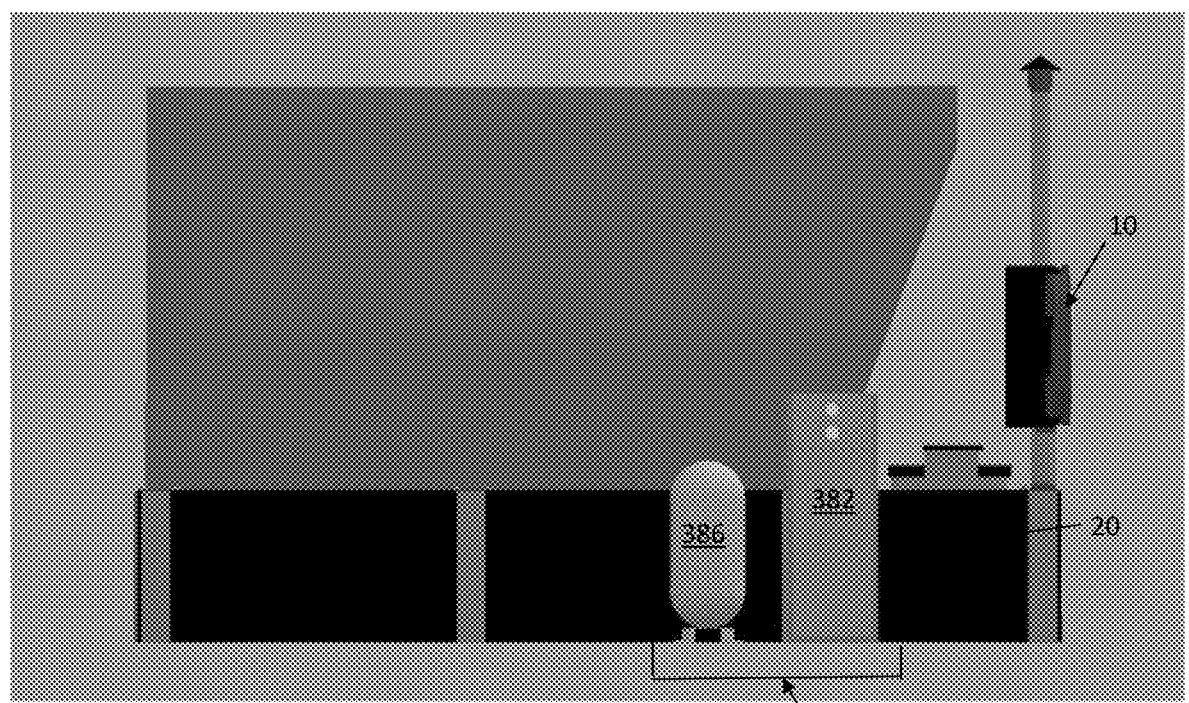

The blanketing/bubbling subsystem 380 includes an inert gas generator 382. The generator 382 is connected by an inlet 384 to a buffer tank 386 via a valve manifold 388. The valve manifold 388 is connected to an outlet 390 that connects to the hose subsystem 200 via a connector 229. The connector 229 engages the adapter 110, as shown in FIGS. 16a-b. The buffer tank 386 includes a pressure sensor 392 to measure the pressure in the tank 386. As illustrated in FIGS. 2b and 16a-b, the majority of the blanketing subsystem 380 can be found external to the housing 100. In an aspect, the blanketing/bubbling subsystem 380 can have a separate feed within the closed hose subsystem 200 that connects directly from the outlet 390 to the access port adapter 110. As discussed above, the access port adapter 110 can include a blanketing/bubbling tube. In an aspect, the length of the blanketing/bubbling tube can be determined based upon whether the system is bubbling or blanketing, with a bubbling tube needed to extend as deep into the container as possible, and the blanketing tube not needing to be as long in length. The blanketing/bubbling tube 110 can be separately connected to components of the closed hose subsystem 200, including a separate line from the blanketing/bubbling subsystem 380.

In an aspect, when multiple LCMMS 10 are used with one master LCMMS 10, the generator 282 only has one line to feed all of the tanks, feeding into the master LCMMS 10. In such aspects, the line is connected to the closed hose subsystem 200 within the housing 100 so that a PLC/Controller 400, discussed below, and an ASCO N/C solenoid 362 can be connected and will then be connected to a 3 way manifold 386 (shown in FIGS. 8 and 9 respectively) that is also installed inside of the housing 100 of the master LCMMS 10 (the reason why we run everything inside of the master LCMMS 10 housing 100 is because it is already an enclosed system and we don't want anyone to tamper with the equipment). The manifold 386 will have 4 hoses connected to it, 1: inlet from the solenoid (feeding all tanks), 3: hoses that will run to each box (1 of the hoses will stay inside of the box and feed the tank of the master LCMMS 10). In another aspect, a manifold solenoid that can vary between three to eight tanks can be used to inert nitrogen. In such instances, the technology port of the adapter 110 will communicate back to the PLC to alert if the pressure is high or low. Then the manifold solenoid will only release nitrogen pressure into the desired tank.

As discussed above, the operation of the closed hose subsystem 200 and the various treatment systems 300 are controlled by a computing device 400. In an aspect, the computing device 400 comprises a programmable logic controller 400. The programmable logic controller (PCL) 400 can be contained within the housing of the LCMMS 10, as shown in FIG. 2. The PLC 400 is configured to communicate with the various electrical components of the subsystems 200, 300, as well as control their operation, as well as monitor the condition of the LCMMS 10, including the liquid of the container 20. In an aspect, the PLC 400 can be configured to pass along real time alerts to administrators on the condition of the LCMMS 10 and the liquid. In another aspect, the PLC 400 can be configured to be controlled automatically after programming, as well as provide real time remote control of the system by a user via a user device in communication with the PLC 400. As discussed above, multiple LCMMS's 10 can be implemented at a site with multiple containers 20. In such situations, one LCMMS 10 will be dedicated as the master LCMMS 10, with its PLC 400 controlling all, most, or some of the operations of the other LCMMS 10. This is especially the case with the dosing subsystems 350 and the blanketing/bubbling subsystem 380.

The PLC 400 is configured to control the initiation and operation duration of the pump 240 of the closed hose subsystem 200. In addition, the PLC 400 can communicate with various sensors (not shown) associated with the various subsystems. For example, filter sensors associated with the filter subsystem 310 can communicate with the PLC 400 to warn when the filters need to be replaced, or if there is a particularly high amount of the filtered-target present in the liquid. Other types of sensors, located throughout the LCMMS 10, can be in communication with the PLC 400. For example, such sensors include, but are not limited to, temperature, humidity, oxygen, water, capacity (e.g., sensors in the tank 20 reporting the level of liquid contained), pressure, tamper/activity (i.e., someone has interacted with the LCMMS 10), fuel quality, leaks, and inert gas purity.

In addition, the PLC 400 can activate the various valves, manifolds, and pumps of the subsystems. For example, the PLC 400 can activate the solenoid and manifold valves of the dosing unit subsystem 350 and the blanketing subsystem 380. Additionally, the PLC 400 can control the pumps 240, 360, and generators 382. The PLC 400 can also monitor the power supply for the LCMMS 10 from the various power sources, and switch the source (e.g., from the power grid to a solar-power charged battery) when power interruptions occur.

Further, one skilled in the art will appreciate that the PLC 400 (illustrated in FIG. 20) can be thought of as a general-purpose computing device contained within the LCMMS 10. The components of the PLC 400 can comprise, but are not limited to, one or more processors or processing units 403, a system memory 412, and a system bus 413 that couples various system components including the processor(s) 403 to the system memory 412. In the case of multiple processing units 403, the system can utilize parallel computing.

The system bus 413 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 413, and all buses specified in this description can also be implemented over a wired or wireless network connection and each of the subsystems, including the processor 403, a mass storage device 404, an operating system 405, control applications 406, data 407, a network adapter 408, system memory 412, an Input/Output Interface 410, a display adapter 409, a display device 411, and a human machine interface 402.

The PLC 400 can comprise computer readable media. Exemplary readable media can be any available media that is accessible by the MC 401 and comprises, for example and not meant to be limiting, both volatile and non-volatile media, removable and non-removable media. The system memory 412 comprises computer readable media in the form of volatile memory, such as random access memory (RAM), and/or non-volatile memory, such as read only memory (ROM). The system memory 412 typically contains data such as data 407 and/or program modules such as operating system 405 and control/operation application 406 that are immediately accessible to and/or are presently operated on by the processing unit 403.

Figure 20:
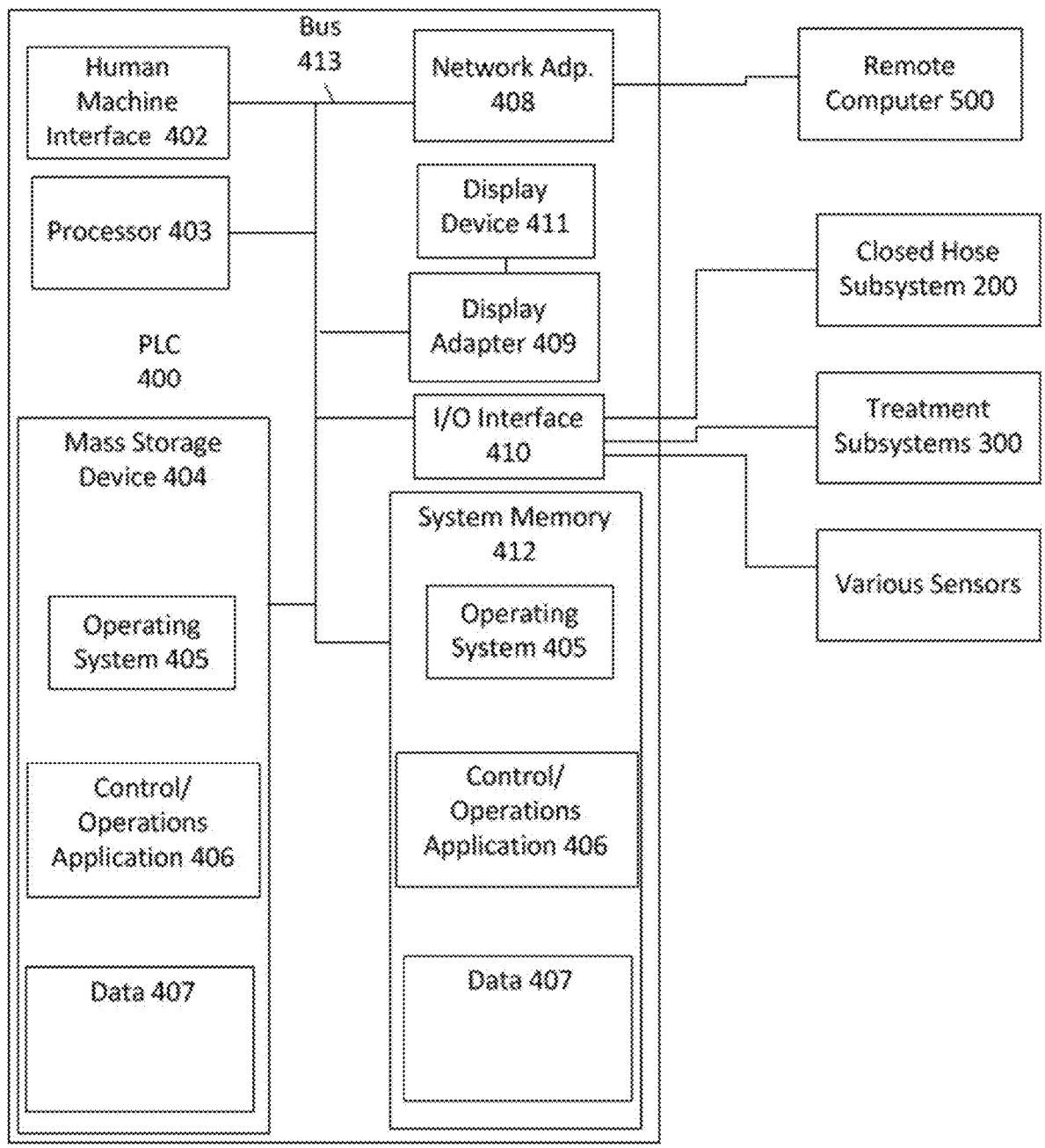
FIG. 20 is a schematic representation of a computing device of a liquid container monitoring and maintenance system according to an aspect of the present invention.
Figure 21:
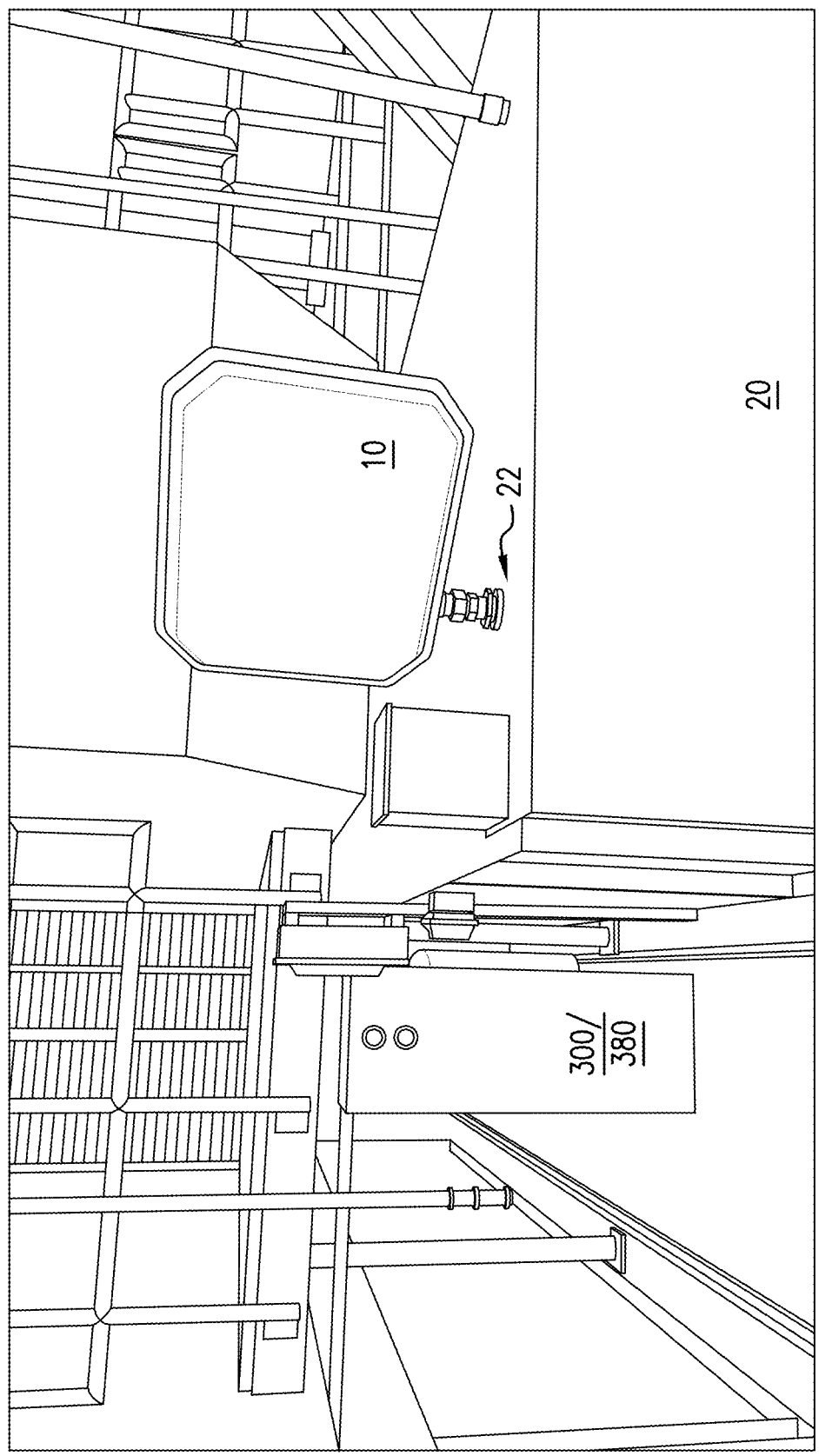
FIG. 21 illustrates a monitoring and maintenance system according to an aspect of the present invention.
Figure 22:
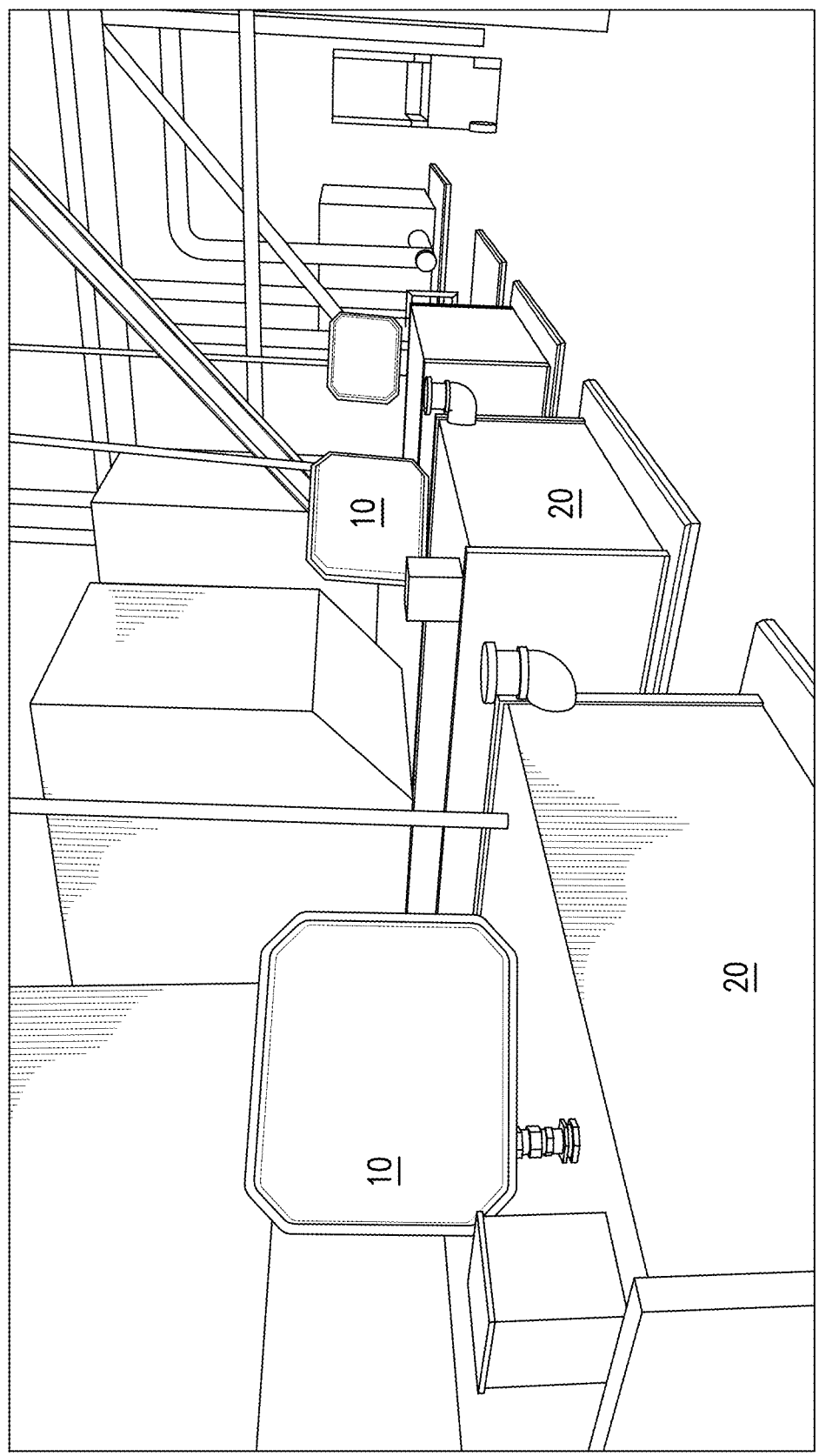
FIG. 22 illustrates multiple monitoring and maintenance systems installed with multiple containers according to an aspect of the present invention.

In another aspect, the PLC 400 can also comprise other removable/non-removable, volatile/non-volatile computer storage media. By way of example, FIG. 20 illustrates a mass storage device 404 which can provide non-volatile storage of computer code, computer readable instructions, data structures, program modules, and other data for the PLC 400. For example and not meant to be limiting, a mass storage device 404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 404, including by way of example, an operating system 405 and control/operation applications 1406. Each of the operating system 405 and the control/operation applications 406 (or some combination thereof) can comprise elements of the programming and the applications 406. Data 407 can also be stored on the mass storage device 404. Data 407 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the PLC 400 through a human machine interface 402 or over a wired or wireless network connected to the network adapter. However, other input devices, including, but not limited to, a keyboard, human interface (e.g., the touch screen analog interface discussed above), mouse, and the like, can be used. These and other input devices can be connected to the processing unit 403 via a human machine interface 402 that is coupled to the system bus 413, but can be connected by other interface and bus structures, such as a parallel port, game port, an IEEE 1394 Port (also known as a Firewire port), a serial port, or a universal serial bus (USB).

In yet another aspect, a display device 411 can also be connected to the system bus 1413 via an interface, such as a display adapter 409. In addition to the display device 411, other output peripheral devices can comprise components that can be connected to the PLC 400 via Input/Output Interfaces 410 (e.g., external connectors). Any step and/or result of the methods can be output in any form to an output device. Such output can be any form of visual representation, including, but not limited to, textual, graphical, animation, audio, tactile, and the like.

For purposes of illustration, application programs and other executable program components such as the operating system 405 are illustrated herein as discrete blocks, although it is recognized that such programs and components reside at various times in different storage components of the PLC 400, and are executed by the data processor(s) of the PLC 400. An implementation of the applications 406 can be stored on or transmitted across some form of computer readable media. Any of the disclosed methods can be performed by computer readable instructions embodied on computer readable media. The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

As discussed above, the PLC 400 is configured to control the operations of the subsystems 200, 300 of the LCMMS 10. In an another aspect, the PLC 400 of a master LCMMS 10 can control the operations of the PLC 400 of other LCMMS's 10 in a connected situation. The PLC 400 can be pre-programmed to operate based upon set parameters (e.g., activate pump 240 to circulate fluid for 30 minutes every 6 hours) or based upon sensing certain conditions (e.g., pressure drop in container below a threshold initiates activation of blanket subsystem 380). In other aspects, a user can control the operations via the PLC 400 via the human machine interface 402 or through an interface with access to the PLC 400 from a remote computer 500.

The PLC 400 can control the operation of the filtration subsystem 310 through pre-programming. For example, the PLC 400 can activate the pump 240 of the closed hose subsystem 200 every day for 30 minutes starting at 9 am and ending at 9:30 am. Likewise, the PLC can make changes to the schedule and length of pumping based upon readings obtained by the various sensors utilized by the PLC 400. For example, if the levels of water and particulate found in the diesel are well above acceptable thresholds, the PLC 400 can increase the number of filtration cycles or increase their duration. The PLC 400 can also control the operation of the dose unit subsystem 350. For example, the PLC 400 can turn on the motor of the pump 360 of the dose unit subsystem 350, pulling the additive from the container 352. A pre-programmed amount can be pulled, or based upon direct input from an administrator of the PLC 400. Once the amount has been pulled, the solenoid valve can be activated, putting the chemical into the closed hose subsystem 200, and into the container 20. Similarly, the PLC 400 can control the addition of the inert gas from the blanketing/bubbling subsystem 380. At a planned time, or as a result of sensor readings detecting a set parameter (e.g., low pressure in the container 20), the PLC 400 can activate the inert gas generator 382, which can pass the inert gas into the buffer tank 386. The PLC 400 can then call on the manifold to equally disperse the inert gas to the needed tanks/containers 20.

The LCMMS 10 is configured to be used with various containers and storage systems. For example, the LCMMS 10 can be used with above ground and below ground storage tanks, diesel generator tanks belly tank, and any tank especially for fuel storage. The normal shelf life of fuel within such tanks last between 4-7 months. The LCMMS 10 can greatly increase the life through the filtration of water and particulates, as the constant movement of the fuel to prevent degradation of the fuel.

As discussed above, the LCMMS 10 is configured to be connected through various access ports 22 of a container 20. In an aspect, the access port adapter 110 can be configured to have modular components allowing the access port adapter 110 to be modified for connection to various access port shapes and sizes of various containers 20. Further, the LCMMS 10 can be used with containers 20 ranging from very small amounts to those capable of storing millions of gallons of liquid. In such aspects, the LCMMS 10 can include more powerful pumps as well as parallel filtration subsystems.

The LCMMS 10 can also be used with sprinkler systems in order to prevent rust from forming inside the tank. Sprinkler systems are constantly changed out because of the constant buildup of rust inside of the storage tank and pipe lines, which will then lead a company to spend a fortune on replacing that system and installing a new one. The LCMMS 10 will prevent rust through the constant movement of the water, preventing condensation on the tank through bubbling/blanketing subsystems 380, and removal of rust particulate constantly. In an aspect, the LCMMS 10 is installed after the container has been fully cleaned, and the fuel/liquid polished before being returned to the container, and then continues to polish the fluid as it operates.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. To the extent necessary to understand or complete the disclosure of the present invention, all publications, patents, and patent applications mentioned herein are expressly incorporated by reference therein to the same extent as though each were individually so incorporated.

Having thus described exemplary embodiments of the present invention, those skilled in the art will appreciate that the within disclosures are exemplary only and that various other alternatives, adaptations, and modifications may be made within the scope of the present invention. Accordingly, the present invention is not limited to the specific embodiments as illustrated herein, but is only limited by the following claims.

We claim:

1. A monitoring and maintenance system for a liquid container, comprising:

a. a housing;

b. an access port adapter coupled to the housing, wherein the access port adapter is configured to attach to an access port of the liquid container, the liquid container containing liquid, wherein the access port adapter further comprises an inlet pipe and an outlet pipe, wherein the inlet pipe and the outlet pipe extend into an interior of the liquid container to be in communication with liquid stored within the liquid container, and wherein the access port adapter and housing are attached to the access port of the liquid container on an exterior of the liquid container;

c. at least one closed hose subsystem connected to the access port adapter and configured to direct liquid from and back to the liquid container via the access port adapter, wherein the at least one closed hose system is contained and operates within the housing and comprises an intake end and an outlet end, wherein the intake end is connected to the inlet pipe of the access port adapter and the outlet end is connected to the outlet pipe of the access port adapter;

d. at least one pumping mechanism connected to and configured for forcing the liquid from the liquid container through the at least one closed hose subsystem in a unidirectional flow from the inlet pipe, through the intake end, the outlet end, and out the outlet pipe to recirculate the liquid within the interior of the liquid container, wherein the at least one pumping mechanism is contained and operates within the housing;

e. at least one liquid treatment subsystem in communication with the at least one closed hose subsystem, the at least one liquid treatment subsystem configured to treat the liquid;

f. a computing device configured to monitor and control the treatment and flow of the liquid by the monitoring and maintenance system at intervals over extended periods of time, the computing device controlling the flow of the liquid via controlling the at least one pumping mechanism, and the computing device contained within the housing but separate from the at least one closed hose subsystem and the at least one liquid treatment subsystem; and g. an electronic power source to power the at least one pumping mechanism and the computing device.

2. The system of claim 1, wherein the at least one liquid treatment subsystem further comprises a blanketing subsystem or a bubbling subsystem controlled by the computing device.

3. The system of claim 2, wherein the blanketing subsystem or the bubbling subsystem further comprise an inert gas generator and a pressure sensor in communication with and controlled by the computing device.

4. The system of claim 1, wherein the least one liquid treatment subsystem further comprises a dosing unit subsystem controlled by the computing device, the dosing unit subsystem configured to add an additive to the liquid.

5. The system of claim 1, wherein the computing device further comprises a user interface on an exterior of the housing.

6. The system of claim 1, wherein the access port adapter further comprises a monitoring port and at least one sensor, wherein the at least one sensor is in communication with the computing device.

7. The system of claim 1, wherein the access port adapter further comprises a technology manifold coupled with at least one sensor for monitoring environmental characteristics in the liquid container.

8. The system of claim 7, further comprising a camera coupled to the technology manifold for visual monitoring via the computing device.

9. The system of claim 1, wherein the housing has a center bottom, wherein the access port adapter is connected to the housing at the center bottom to allow for the housing to be mounted on top of the liquid container.

10. The system of claim 1, wherein the inlet pipe and the outlet pipe are adjustable, allowing ends of each to be oriented in opposite directions from one another.

11. The system of claim 10, wherein the circulation of the liquid within the liquid container caused by the at least one closed hose subsystem, the at least one pumping mechanism, and the inlet pipe and the outlet pipe of the access port adapter forms a figure eight motion.

12. The system of claim 4, wherein the access port adapter further comprises an outlet connector to connect the outlet pipe and the dosing unit subsystem.

13. The system of claim 1, wherein the at least one liquid treatment subsystem further comprises a filtration subsystem contained and operating within the housing.

14. The system of claim 13, wherein the filtration subsystem comprises a particulate filter subsystem and a water filter subsystem to remove particulate and water from the liquid respectively.

15. The system of claim 1, wherein the at least one liquid treatment subsystem comprises a filtration subsystem, a blanketing subsystem or a bubbling subsystem, and a dosing unit subsystem.

16. The system of claim 1, wherein the liquid container is a diesel fuel tank.

17. The system of claim 1, wherein the liquid container is a sprinkler system.

18. The system of claim 1, wherein the access port adapter includes a coupling means that allows the monitoring and maintenance system to swivel in relation to the liquid container after connecting the access port adapter to the access port of the liquid container.

* * * * *